United States Patent
Masuda et al.

(10) Patent No.: US 8,855,417 B2
(45) Date of Patent: Oct. 7, 2014

(54) METHOD AND DEVICE FOR SHAPE EXTRACTION, AND SIZE MEASURING DEVICE AND DISTANCE MEASURING DEVICE

(75) Inventors: Tomonori Masuda, Saitama (JP); Eiji Ishiyama, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 178 days.

(21) Appl. No.: 13/641,452

(22) PCT Filed: May 24, 2011

(86) PCT No.: PCT/JP2011/061800
§ 371 (c)(1),
(2), (4) Date: Oct. 15, 2012

(87) PCT Pub. No.: WO2012/002069
PCT Pub. Date: Jan. 5, 2012

(65) Prior Publication Data
US 2013/0034270 A1    Feb. 7, 2013

(30) Foreign Application Priority Data
Jun. 29, 2010 (JP) ................................ 2010-147804

(51) Int. Cl.
| G06K 9/00 | (2006.01) |
| G01B 11/02 | (2006.01) |
| G01B 5/00 | (2006.01) |
| G06T 7/60 | (2006.01) |
| G06T 7/00 | (2006.01) |
| G06K 9/62 | (2006.01) |

(52) U.S. Cl.
CPC ............... *G01B 11/02* (2013.01); *G06T 7/0083* (2013.01); *G06K 9/6206* (2013.01); *G01B 5/0035* (2013.01); *G06T 7/60* (2013.01); *G06T 2207/30161* (2013.01)
USPC .......................................... 382/173; 382/103

(58) Field of Classification Search
None
See application file for complete search history.

(56) References Cited

U.S. PATENT DOCUMENTS

| 8,699,766 B2 * | 4/2014 | Cong et al. ................... 382/128 |
| 2003/0099397 A1 * | 5/2003 | Matsugu et al. ............... 382/173 |
| 2004/0208341 A1 * | 10/2004 | Zhou et al. .................... 382/103 |

(Continued)

FOREIGN PATENT DOCUMENTS

JP    11-151232 A    6/1999

OTHER PUBLICATIONS

International Search Report in PCT/JP2011/061800 dated Jun. 21, 2011(English Translation Thereof).

*Primary Examiner* — Hadi Akhavannik
(74) *Attorney, Agent, or Firm* — McGinn IP Law Group, PLLC

(57) ABSTRACT

When an image is captured in a wood lumber measuring mode, a distance to wood lumber is detected. An area extracting unit 51 for a component drawing image area extracts component image areas 53A-53L of the wood lumber. A drawing generator 61 for a component drawing image selects the component image areas 53A-53L successively to generate a component drawing image 62. Among shape lines in the component drawing image 62, an eliminator 66 eliminates a paracentral shape line 71, an edge side shape line 72, a peripheral shape line 73 and determined shape lines 74. If a total pixel number of a portion where an estimated elliptical shape 76 generated by a shape estimation unit 67 is overlapped on a residual shape line 75 disposed inside a corrected drawing image 64 is more than a threshold, it is judged that the estimated elliptical shape 76 is correctly shaped. An object shape determining unit 83 extracts the estimated elliptical shape 76 as a shape of wood lumber. A size measuring unit 84 measures a size of the estimated elliptical shape. A size determining unit 85 determines an actual size of the wood lumber according to the size measured by the size measuring unit 84, the distance to the wood lumber and a focal length.

19 Claims, 17 Drawing Sheets

(56) References Cited

U.S. PATENT DOCUMENTS

| | | | |
|---|---|---|---|
| 2004/0218797 A1* | 11/2004 | Ladak et al. | 382/131 |
| 2005/0100208 A1* | 5/2005 | Suzuki et al. | 382/157 |
| 2008/0002870 A1* | 1/2008 | Farag et al. | 382/128 |
| 2008/0069445 A1* | 3/2008 | Weber | 382/181 |
| 2009/0252395 A1* | 10/2009 | Chan et al. | 382/131 |
| 2010/0046830 A1* | 2/2010 | Wang et al. | 382/164 |

* cited by examiner 53A (COMPONENT IMAGE AREA)

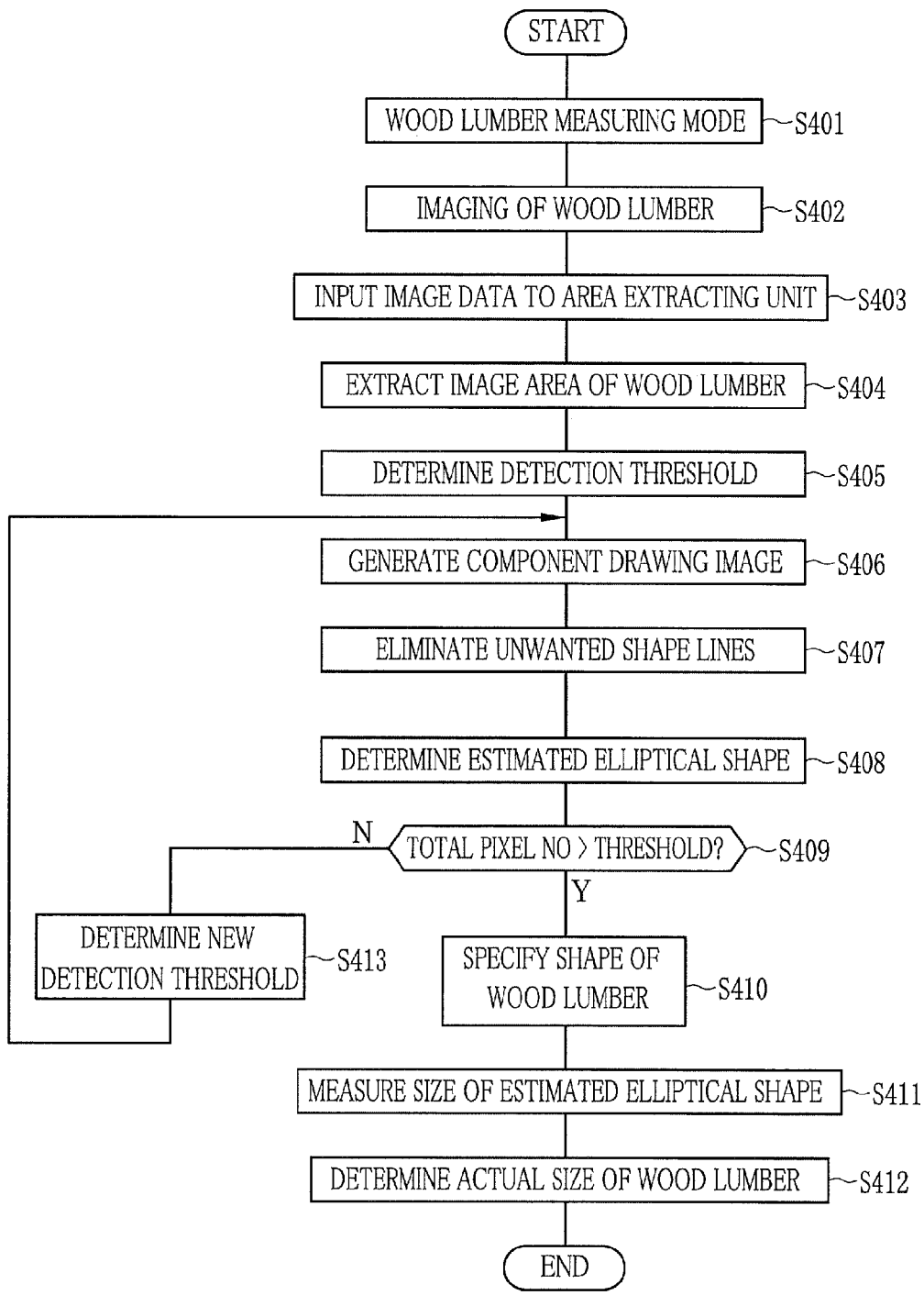

METHOD AND DEVICE FOR SHAPE EXTRACTION, AND SIZE MEASURING DEVICE AND DISTANCE MEASURING DEVICE

TECHNICAL FIELD

The present invention relates to a method and device for extracting a shape of a particular object from inside an object image, and a device for measuring a size of the extracted object and a distance to the object.

BACKGROUND ART

A size measuring device has been suggested recently, in which an object is imaged to measure its size. The size measuring device recognizes an image of the object on a screen according to a feature value such as color, shape and the like, and extracts the shape of an object image being recognized. The size of the object is arithmetically determined according to the extracted shape of the object image. In order to extract the shape of the object image, the image is converted into a drawing image in which shape lines are used to express the image. The extraction is based on the shape lines included in the drawing image.

In a lung region extraction device disclosed in Patent Document 1, the object image is positioned at the center of the frame at the time of extracting the object image, to eliminate the shape lines contacting a boundary edge of the image. In the lung region extraction device, the shape of the object image is exactly extracted by not extracting lines other than the shape lines in the object image.

PRIOR ART DOCUMENTS

Patent Documents

Patent Document 1: Japanese Patent Laid-open Publication No. 11-151232

SUMMARY OF INVENTION

Problems to Be Solved by The Invention

A method of edge detection is used for conversion into the drawing image. The shape lines are formed according to detected edges. Thus, the drawing image expressed by the shape lines contains the shape lines (outer shape lines) expressing an outer shape of the object image, but also includes a partial image or patterned lines (pseudo shape lines). It is necessary to extract the outer shape lines from the drawing image correctly for the purpose of precisely extracting the shape of the object image. In the device disclosed in Patent Document 1, pseudo shape lines contacting the boundary edge of the image are eliminated. However, the remainder of the pseudo shape lines are not eliminated, for example, pseudo shape lines disposed inside the outer shape lines, and pseudo shape lines disposed outside the outer shape lines but not contacting the boundary edge of the image. Numerous pseudo shape lines other than the outer shape lines become extracted, so that the shape of the object image cannot be correctly extracted.

An object of the present invention is to provide a method and device for shape extraction, and size measuring device and distance measuring device, in which a shape of the object image can be correctly extracted.

Means for Solving the Problems

In order to achieve the above object, a shape extraction device of the present invention includes an area extracting unit, a drawing generator, an eliminator, a shape estimation unit, an evaluation unit and an object shape determining unit. The area extracting unit recognizes component images in which it is presumed that an object in a particular shape is imaged within a frame, to extract component image areas from the frame in which the component images are respectively present. The drawing generator sequentially selects the component image areas, and converts images including the component image in the selected component image areas into respectively a drawing image, to generate a component drawing image. The eliminator eliminates one shape line and/or a certain shape line as an unwanted shape line among shape lines included in respectively the component drawing image, the one shape line having a center in a substantially equal position to a center of the component drawing image and having vertical and horizontal sizes equal to or less than substantially a half of a size of the component drawing image, the certain shape line being disposed on a straight line passing a center point of the one shape line and a center point of the component drawing image. The shape estimation unit determines an estimated shape by optimizing a size of the particular shape so as to correspond to a corrected drawing image after elimination of the unwanted shape line. The evaluation unit judges appropriacy of the estimated shape by evaluating degree of overlap between the estimated shape and the corrected drawing image. The object shape determining unit specifies the estimated shape as a shape of the object extracted from the frame if it is judged that the estimated shape is appropriate.

Also, preferably, if the component image areas overlap on one another, the eliminator further eliminates a shape line of the corrected drawing image in relation to the object of which a shape has been specified.

Preferably, the eliminator further eliminates a shape line contacting a boundary edge of the component image areas.

Also, preferably, the shape estimation unit splits the corrected drawing image into plural areas, and selects a shape line from each of the plural areas, to determine the estimated shape according to a plurality of the selected shape line.

Also, preferably, if it is judged that the estimated shape is inappropriate, the eliminator eliminates a shape line outside the estimated shape.

Also, preferably, the drawing generator includes a plurality of target image detection filters between which thresholds are different for extracting an image to be converted into a drawing image among images included in the selected component image areas, the drawing generator converts the image extracted with each of the target image detection filters into a drawing image, to generate the component drawing image. If it is judged that the estimated shape is inappropriate, the drawing generator generates a new component drawing image by changing over the target image detection filters.

Also, preferably, the drawing generator includes a plurality of target image detection filters between which thresholds are different for extracting an image to be converted into a drawing image among images included in the selected component image areas, the drawing generator converts the image extracted with each of the target image detection filter into a drawing image, to generate a plurality of the component drawing image for any one of the component image areas. The shape estimation unit determines a plurality of the estimated shape respectively by use of the plural component drawing images. The evaluation unit evaluates respectively the plural estimated shapes. The object shape determining unit specifies one of the plural estimated shapes as a shape of the object with a highest evaluation result in the evaluation unit.

Also, preferably, the drawing generator has a plurality of thresholds for binarizing images included in the selected component image areas to generate the component drawing image, and binarizes the images included in the selected component image areas according to any one of the thresholds to generate the component drawing image. If it is judged that the estimated shape is inappropriate, the drawing generator generates a new component drawing image by changing over the thresholds.

Also, preferably, the drawing generator has a plurality of thresholds for binarizing images included in the selected component image areas to generate the component drawing image, and binarizes the images included in the selected component image areas according to each one of the thresholds to generate a plurality of the component drawing image for any one of the component image areas. The shape estimation unit determines a plurality of the estimated shape respectively by use of the plural component drawing images. The evaluation unit evaluates respectively the plural estimated shapes. The object shape determining unit specifies one of the plural estimated shapes as a shape of the object with a highest evaluation result in the evaluation unit.

Also, preferably, a threshold setting unit determines a threshold for generating the component drawing image by binarizing images included in the selected component image areas. The drawing generator binarizes the images included in the selected component image areas according to the threshold determined by the threshold setting unit, and generates the component drawing image. If it is judged that the estimated shape is inappropriate, the threshold setting unit determines a new threshold, and the drawing generator generates a new component drawing image according to the new threshold.

Also, preferably, a threshold setting unit determines a plurality of thresholds for generating the component drawing image by binarizing images included in the selected component image areas. The drawing generator binarizes the images included in the selected component image areas for each of the plural thresholds and generates the plural component drawing images for one of the component image areas. The shape estimation unit determines a plurality of the estimated shape respectively by use of the plural component drawing images. The evaluation unit evaluates respectively the plural estimated shapes. The object shape determining unit specifies one of the plural estimated shapes as a shape of the object with a highest evaluation result in the evaluation unit.

A size measuring device of the present invention includes an area extracting unit, a drawing generator, an eliminator, a shape estimation unit, an evaluation unit, an object shape determining unit, a rangefinding unit, a size measuring unit and a size determining unit. The area extracting unit recognizes component images in which it is presumed that an object in a particular shape is imaged within a frame, to extract component image areas from the frame in which the component images are respectively present. The drawing generator sequentially selects the component image areas, and converts images including the component image in the selected component image areas into respectively a drawing image, to generate a component drawing image. The eliminator eliminates one shape line and/or a certain shape line as an unwanted shape line among shape lines included in respectively the component drawing image, the one shape line having a center in a substantially equal position to a center of the component drawing image and having vertical and horizontal sizes equal to or less than substantially a half of a size of the component drawing image, the certain shape line being disposed on a straight line passing a center point of the one shape line and a center point of the component drawing image. The shape estimation unit determines an estimated shape by optimizing a size of the particular shape so as to correspond to a corrected drawing image after elimination of the unwanted shape line. The evaluation unit judges appropriacy of the estimated shape by evaluating degree of overlap between the estimated shape and the corrected drawing image. The object shape determining unit specifies the estimated shape as a shape of the object extracted from the frame if it is judged that the estimated shape is appropriate. The rangefinding unit measures a distance to the object for imaging the object. The size measuring unit measures a size of the shape of the object specified by the object shape determining unit. The size determining unit determines an actual size of the object according to the distance measured by the rangefinding unit and the size measured by the size measuring unit.

Also, preferably, a magnification input unit inputs an imaging magnification for imaging the object. The size determining unit determines the actual size of the object according to the distance measured by the rangefinding unit, the size measured by the size measuring unit, and the imaging magnification input by the magnification input unit.

A distance measuring device of the present invention includes an area extracting unit, a drawing generator, an eliminator, a shape estimation unit, an evaluation unit, an object shape determining unit, a size input unit, a size measuring unit and a distance determining unit. The area extracting unit recognizes component images in which it is presumed that an object in a particular shape is imaged within a frame, to extract component image areas from the frame in which the component images are respectively present. The drawing generator sequentially selects the component image areas, and converts images including the component image in the selected component image areas into respectively a drawing image, to generate a component drawing image. The eliminator eliminates one shape line and/or a certain shape line as an unwanted shape line among shape lines included in respectively the component drawing image, the one shape line having a center in a substantially equal position to a center of the component drawing image and having vertical and horizontal sizes equal to or less than substantially a half of a size of the component drawing image, the certain shape line being disposed on a straight line passing a center point of the one shape line and a center point of the component drawing image. The shape estimation unit determines an estimated shape by optimizing a size of the particular shape so as to correspond to a corrected drawing image after elimination of the unwanted shape line. The evaluation unit judges appropriacy of the estimated shape by evaluating degree of overlap between the estimated shape and the corrected drawing image. The object shape determining unit specifies the estimated shape as a shape of the object extracted from the frame if it is judged that the estimated shape is appropriate. The size input unit inputs an actual size of the object. The size measuring unit measures a size of the shape of the object specified by the object shape determining unit. The distance determining unit determines a distance to the object for imaging the object according to the actual size input by the size input unit and the size measured by the size measuring unit.

Also, preferably, a magnification input unit inputs an imaging magnification for imaging the object. The distance determining unit determines the distance to the object according to the actual size input by the size input unit, the size measured by the size measuring unit, and the imaging magnification input by the magnification input unit.

A shape extraction method of the present invention includes an area extracting step, a drawing generation step, an elimination step, a shape estimation step, an evaluation step and an object shape determining step. In the area extracting step, component images are recognized in which it is presumed that an object in a particular shape is imaged within a frame, to extract component image areas from the frame in which the component images are respectively present. In the drawing generation step, the component image areas are sequentially selected, and images including the component image in the selected component image areas are converted into respectively a drawing image, to generate a component drawing image. In the elimination step, one shape line and/or a certain shape line as an unwanted shape line is eliminated among shape lines included in respectively the component drawing image, the one shape line having a center in a substantially equal position to a center of the component drawing image and having vertical and horizontal sizes equal to or less than substantially a half of a size of the component drawing image, the certain shape line being disposed on a straight line passing a center point of the one shape line and a center point of the component drawing image. In the shape estimation step, an estimated shape is determined by optimizing a size of the particular shape so as to correspond to a corrected drawing image after elimination of the unwanted shape line. In the evaluation step, appropriacy of the estimated shape is judged by evaluating degree of overlap between the estimated shape and the corrected drawing image. In the object shape determining step, the estimated shape is specified as a shape of the object extracted from the frame if it is judged that the estimated shape is appropriate.

Effect of the Invention

In the present invention, one shape line and/or a certain shape line as an unwanted shape line is eliminated among shape lines included in respectively the component drawing image, the one shape line having a center in a substantially equal position to a center of the component drawing image and having vertical and horizontal sizes equal to or less than substantially a half of a size of the component drawing image, the certain shape line being disposed on a straight line passing a center point of the one shape line and a center point of the component drawing image. An estimated shape is determined by optimizing a size of the particular shape so as to correspond to a corrected drawing image after elimination of the unwanted shape line. Thus, it is possible correctly to extract the object shape.

Also, if the component image areas overlap on one another, a shape line of the corrected drawing image in relation to the object of which a shape has been specified is also eliminated. Thus, it is possible to specify the object shape in a still more precise manner.

BRIEF DESCRIPTION OF DRAWINGS

FIG. 17 is a flow chart illustrating processing steps for measuring an actual size of the wood lumber material in the sixth embodiment.

MODE FOR CARRYING OUT THE INVENTION

Figure 1:
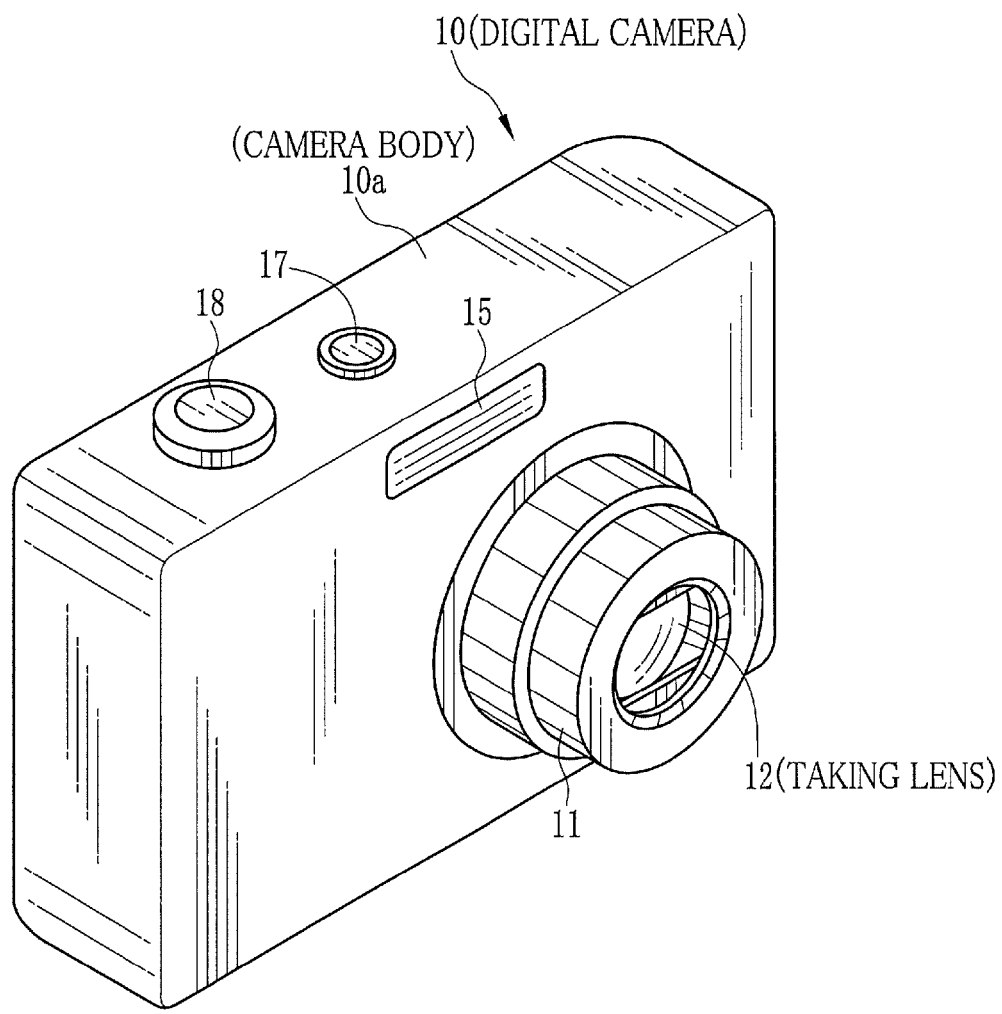
FIG. 1 is a front perspective view illustrating a digital camera in which the present invention is embodied.

As shown in FIG. 1, a digital camera 10 has a lens barrel 11 in a front surface of a camera body 10a. A taking lens 12 is incorporated in the lens barrel 11. The lens barrel 11, while a power source of the digital camera 10 is turned off, is contained inside the camera body 10a, and while the power source is turned on, protrudes from the front surface of the camera body 10a and is set in a wide-angle position. A zoom lens having a magnification lens 12a and a focus lens 12b (see FIG. 3) is used as the taking lens 12.

A flash light source 15 is disposed on the front surface of the camera body 10a. The flash light source 15 is driven by a CPU 40 (see FIG. 3) and emits flash light to an object. A power source button 17, a release button 18 and the like are disposed on an upper surface of the camera body 10a.

In the digital camera 10, there are an imaging mode, a playback mode and a measuring mode. The imaging mode is for capturing a still image. The playback mode is for playing back the captured image. The measuring mode is for imaging an object to measure its actual size. Also, the measuring mode is a plurality of measuring modes according to types of the object (for example, a wood lumber measuring mode, a box measuring mode and the like).

The release button 18 is in a two-step structure. In the imaging mode and the measuring mode, when the release button 18 is depressed lightly (halfway), adjustment of exposure and focus adjustment are carried out as operation preparatory for capturing an image. When the release button 18 is depressed further (fully), an image is captured.

Figure 2:
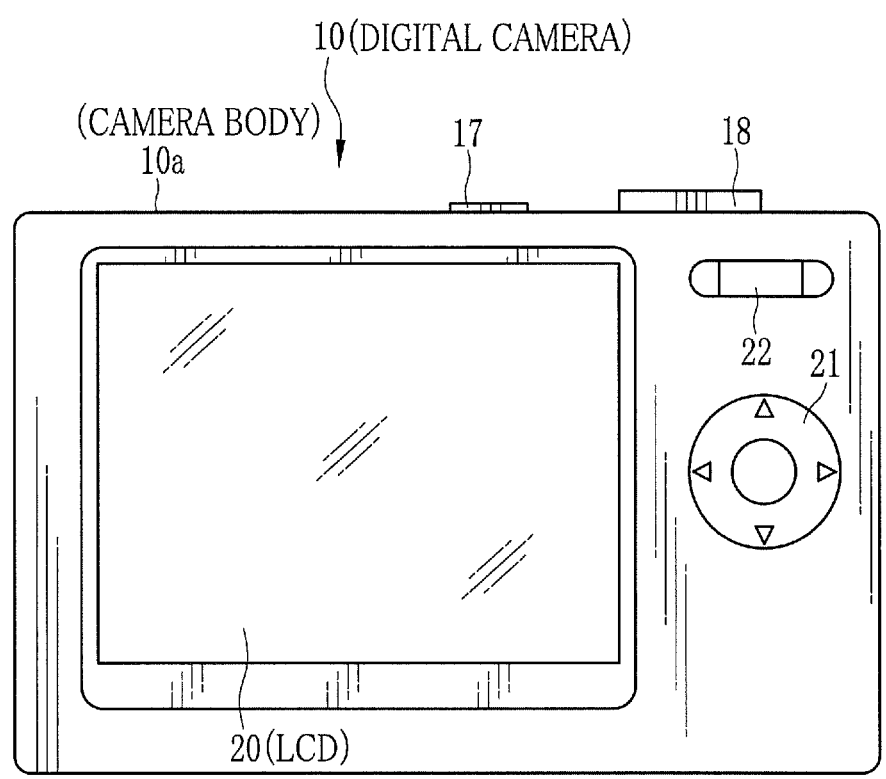
FIG. 2 is a rear view illustrating the digital camera.

As shown in FIG. 2, a back surface of the camera body 10*a* has an LCD 20, menu keys 21 and a zoom button 22. The LCD 20 displays an image and various setting conditions. The menu keys 21 are for setting the condition of capturing an image and selection of modes. The zoom button 22 changes a magnification of the taking lens 12. The zoom button 22 is manipulated to move the magnification lens 12*a* between a wide-angle position and telephoto position, to enlarge or reduce an image.

Figure 3:
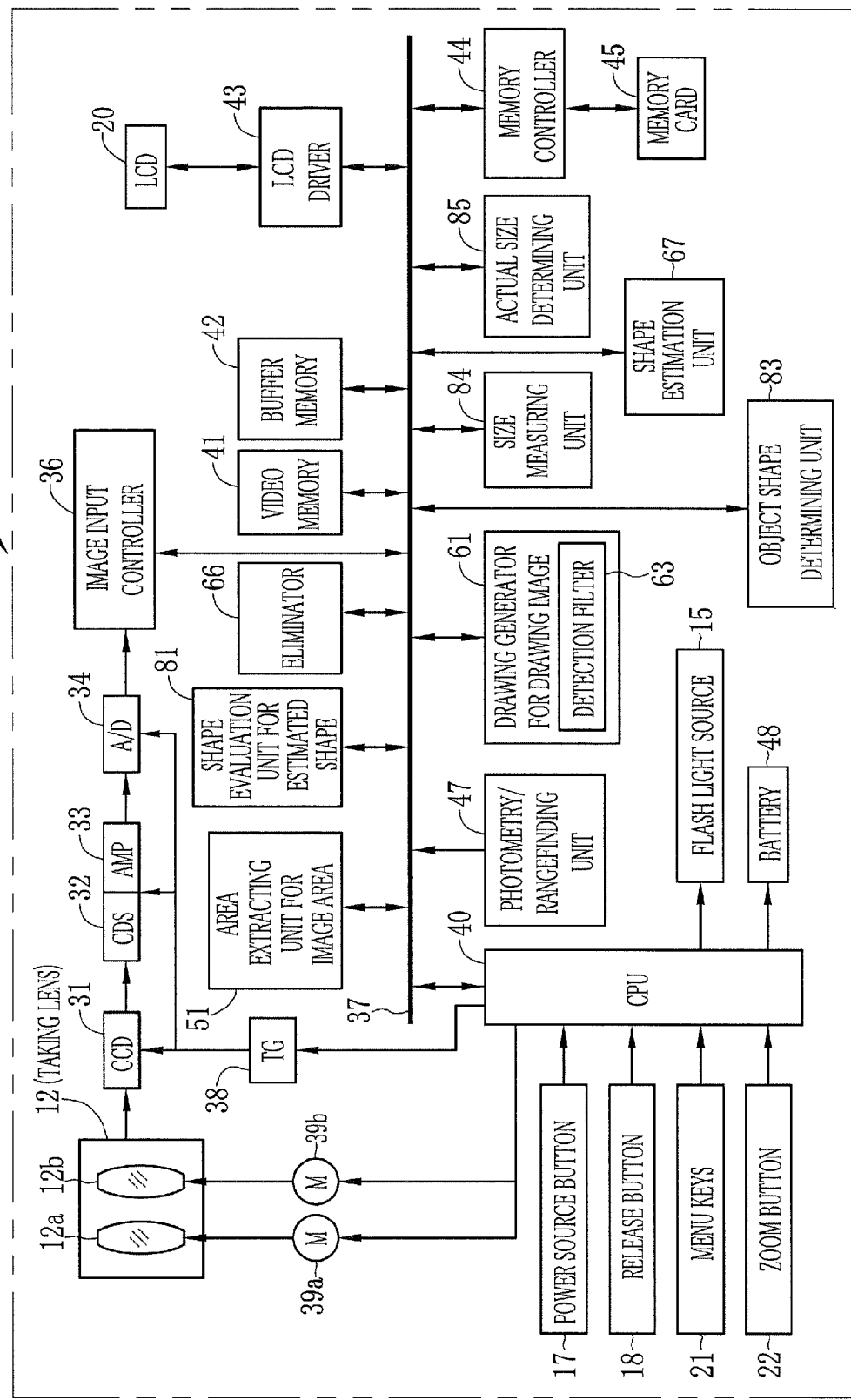
FIG. 3 is a block diagram illustrating electric arrangement of the digital camera.

As shown in FIG. 3, a color image sensor, for example a CCD 31 is disposed behind the taking lens 12 for incidence of object light passed through the taking lens 12. The CCD 31 generates three-color signals of a time sequence by photoelectric conversion of an object image as well-known in the art, and sends the three-color signals to a correlated double sampling circuit (CDS) 32. A TG (timing generator) 38 is controlled by the CPU 40, and generates a timing signal for driving, to drive the CCD 31. The three-color signals generated by the CCD 31 are processed by the CDS 32 for elimination of a noise component, and converted into three-color signals corresponding correctly to accumulated charge amounts of respective cells of the CCD 31. The three-color signals output by the CDS 32 are amplified by an amplifier (AMP) 33 according to the ISO sensitivity, and sent to an A/D converter 34.

The A/D converter 34 converts the three-color signals digitally to form three-color image data (hereinafter referred to simply as image data). A zoom motor 39*a* and a focus motor 39*b* are driven through motor drivers (not shown) by the CPU 40, and move the magnification lens 12*a* and the focus lens 12*b* for zooming and focusing.

An EEPROM (not shown) is connected with the CPU 40. In the EEPROM, various control programs and information for setting are recorded as well-known in the art. The CPU 40 reads the programs in the EEPROM, and controls relevant elements.

While a live image is displayed, an image input controller 36 sends image data from the A/D converter 34 to a video memory 41. While an image is captured, the image input controller 36 sends the same to a buffer memory 42. In the imaging of the live image, the image data of the live image with a low definition is recorded to the video memory 41 temporarily. The live image data is sent through a data bus 37 to an LCD driver 43, to display the live image on the LCD 20. When the release button 18 is depressed fully for capturing in the imaging mode or measuring mode, captured image data of a high definition is recorded to the buffer memory 42 temporarily. A memory controller 44 records the image data read from the buffer memory 42 to a memory card 45. The CPU 40 causes the memory controller 44 to record a focal length to the memory card 45, the focal length expressing a zoom magnification (imaging magnification) upon full depression of the release button 18.

When the release button 18 is depressed halfway, a photometry/rangefinding unit 47 detects brightness of an object and a distance to the object according to image data of a live image, and determines a white balance correction amount and lens in-focus position according to a result of the detection. The photometry/rangefinding unit 47 operates at a cyclic period while the live image is displayed. Note that the object distance can be measured by a well-known method, such as phase difference detection and the like.

The photometry/rangefinding unit 47 successively transmits results of detection of the brightness and object distance to the CPU 40. The CPU 40 moves the focus lens 12*b* according to the lens in-focus position from the photometry/rangefinding unit 47. Also, the CPU 40 controls a shutter speed (charge storing time) of the CCD 31 and the operation of the flash light source 15 according to the brightness from the photometry/rangefinding unit 47.

A battery 48 is contained inside the digital camera 10, and supplies power to various elements such as the LCD 20 and the CPU 40. A control circuit (not shown) for the battery 48 controls the power supply to the elements.

Figure 4A:
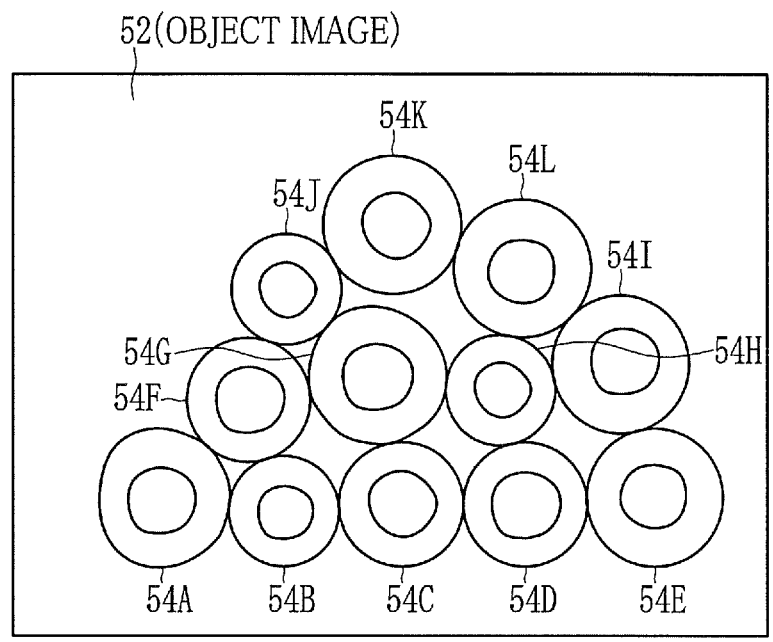
FIG. 4A is an explanatory view illustrating an object image.

When the release button 18 is depressed fully in the measuring mode, an area extracting unit 51 for a component drawing image area reads an object image 52 in the buffer memory 42. As shown in FIG. 4A, the area extracting unit 51 recognizes a component image having a particular shape predetermined for the object image 52 (elliptical for a sectional form of a wood lumber material in the wood lumber measuring mode, and quadrilateral in the box measuring mode). In the present embodiment, the wood lumber measuring mode is selected. 12 wood lumber images 54A-54L are included in the object image 52.

Figure 4B:
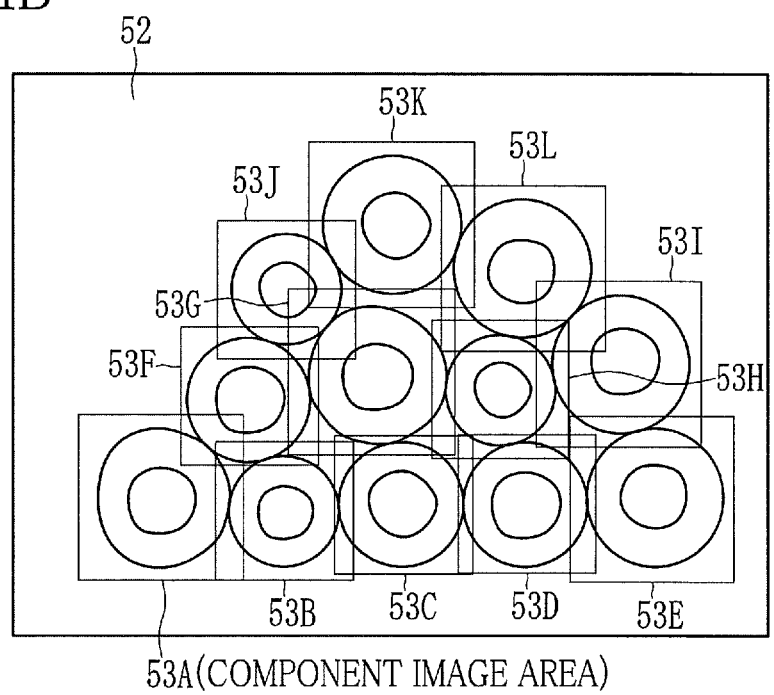
FIG. 4B is an explanatory view illustrating a state of displaying component image areas in the object image.

As shown in FIG. 4B, the area extracting unit 51 extracts component image areas 53A-53L where a component image of each object (wood lumber material) in the object image 52 is present according to a result of the recognition. In FIGS. 4A and 4B, fine lines are omitted from the depiction. Note that the extracted component image area can be analyzed to judge a wood lumber image and an image other than the wood lumber image according to the color of the image, so that a component image area without including a wood lumber image can be removed initially, for example, a component image area including a circular image similar to the wood lumber material.

Figure 5A:
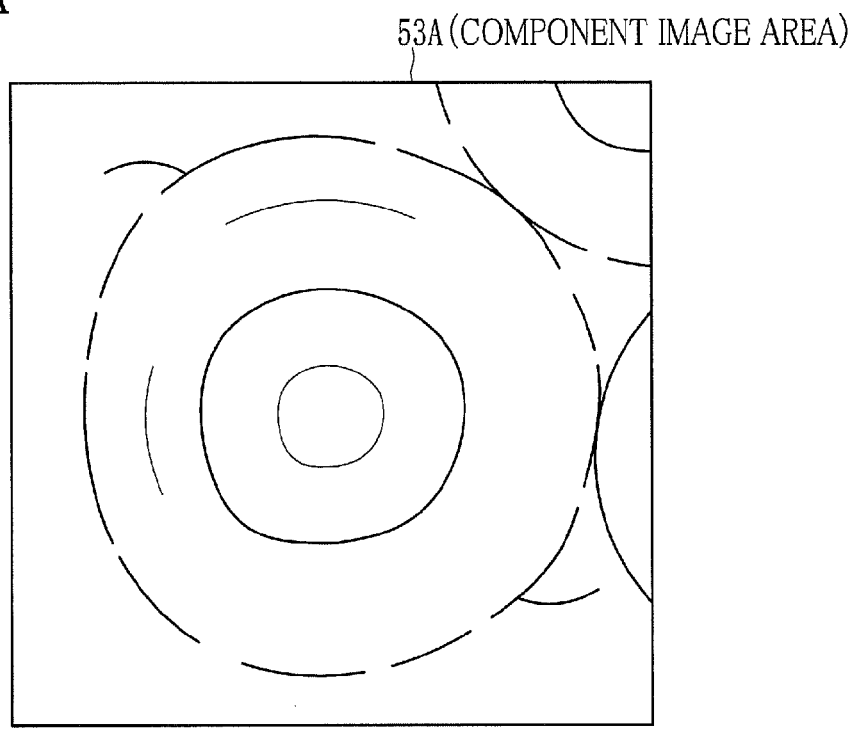
FIG. 5A is an explanatory view illustrating the component image areas.

As shown in FIG. 5A, a drawing generator 61 for a component drawing image (see FIG. 3) selects one of the component image areas 53A-53L (for example, the component image area 53A) extracted by the area extracting unit 51.

The drawing generator 61 includes a target image detection filter 63 for extracting an image for conversion into a drawing image among images inside the selected component image area. The target image detection filter 63 analyzes changes in the color inside the selected component image area in numerical analysis, and extracts an image of which a change in the color is larger than a predetermined detection threshold.

Figure 5B:
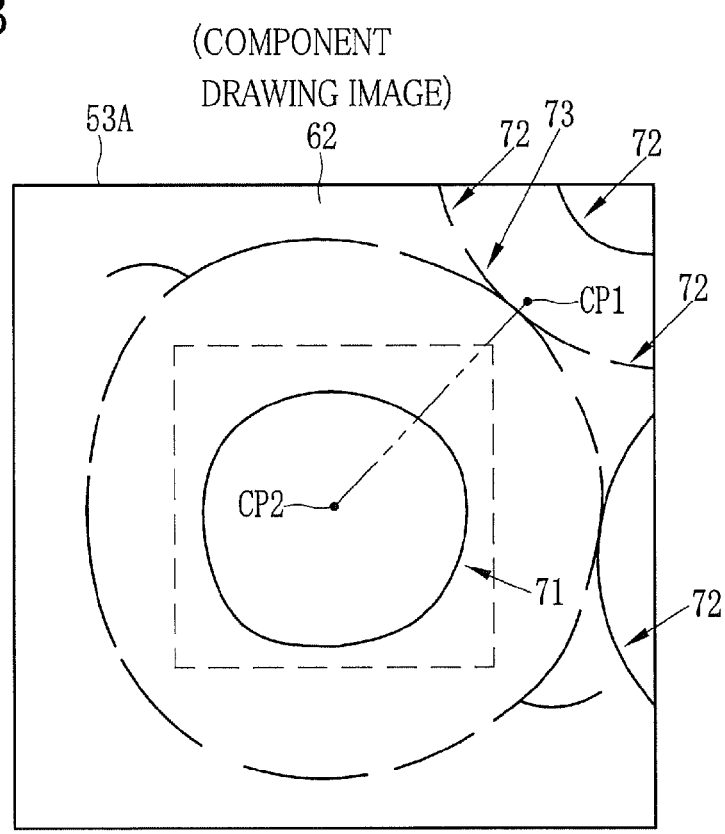
FIG. 5B is an explanatory view illustrating a component drawing image.

As shown in FIG. 5B, the drawing generator 61 produces a component drawing image 62 by converting the image extracted by the target image detection filter 63 into the drawing image. In the present embodiment, the drawing generator 61 selects the component image area 53A, component image area 53B, component image area 53C, . . . , component image area 53K and component image area 53L in the listed order and produces the component drawing image 62 corresponding to each of those.

An eliminator 66 (see FIG. 3) eliminates a paracentral shape line 71 (shape line included in an area surrounded by the broken line in FIG. 5B), an edge side shape line 72, and a peripheral shape line 73 from shape lines included in the component drawing image 62. The paracentral shape line 71 has a center in the same position as the center of the component drawing image 62, and has sizes equal to or less than a half of that of the component drawing image 62 in the vertical and horizontal directions. The edge side shape line 72 contacts the boundary edge of the component image area 53A. The peripheral shape line 73 lies on a straight line (two-dot-dash line in FIG. 5B) passing the center point CP1 as a center (center of gravity) of the shape lines themselves and the center point CP2 of the component drawing image 62. The center point PC1 of the shape lines is a point of the average of the X and Y coordinates in the pixel coordinate system of one shape line. Also, the point of the center coordinates of the straight line passing the ends of one shape line may be a center point CP1 of the shape lines. An area for defining the paracentral shape line 71 is also changeable suitably.

Figure 6:
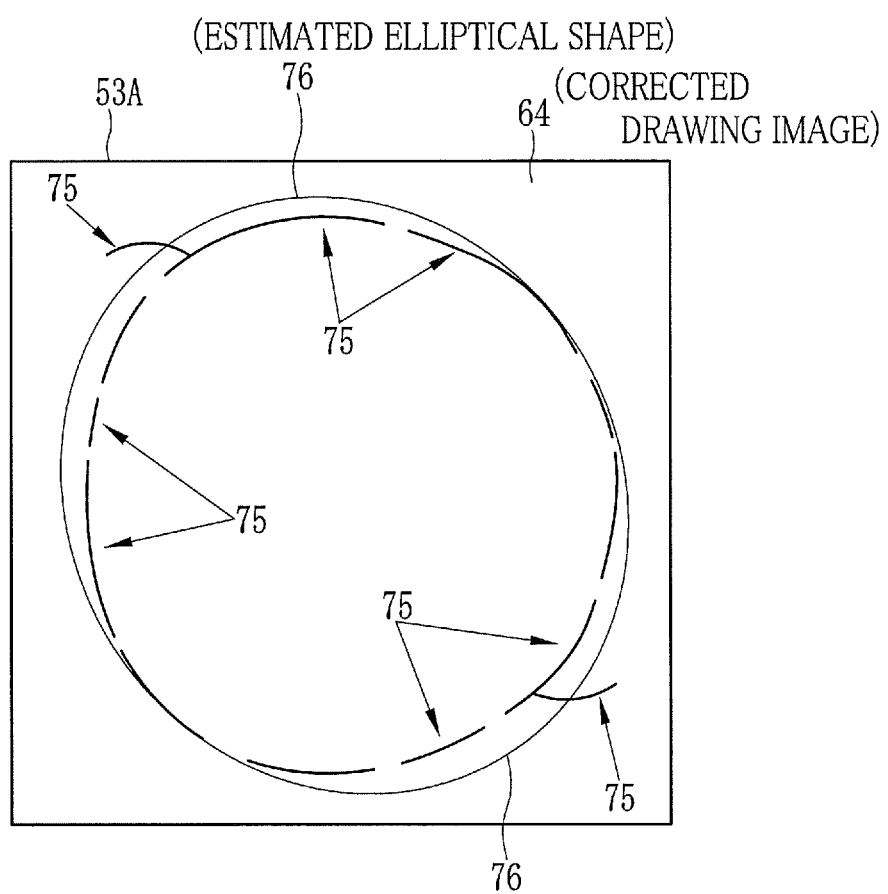
FIG. 6 is an explanatory view illustrating a state of overlap of an estimated elliptical shape on a corrected drawing image.

As shown in FIG. 6, a shape estimation unit 67 (see FIG. 3) performs ellipse fitting of a corrected drawing image 64 after elimination of the shape lines 71-73 in the eliminator 66 according to a well-known fitting method. The shape estimation unit 67 determines an estimated elliptical shape 76 of an optimized size of the ellipse (particular shape) for correspondence to the corrected drawing image 64. In the box measuring mode, the fitting of the box shape is carried out to determine the estimated box shape.

A shape evaluation unit 81 for an estimated shape (see FIG. 3) evaluates the estimated elliptical shape 76 and detects its appropriacy. The shape evaluation unit 81 detects a total pixel number of an overlapped portion between a residual shape line 75 inside the corrected drawing image 64 and the estimated elliptical shape 76. The shape evaluation unit 81, if the total pixel number is more than a predetermined threshold, judges that the estimated elliptical shape 76 is appropriate, and if the total pixel number is equal to or less than the threshold, judges that the estimated elliptical shape 76 is not appropriate. Note that the threshold can be changeable, and can be determined by a user.

If the shape evaluation unit 81 judges that the estimated elliptical shape 76 is inappropriate, the eliminator 66 eliminates shape lines disposed outside the estimated elliptical shape 76. Then the shape evaluation unit 81 carries out determination and evaluation of the estimated elliptical shape 76 again, and repeats those until it is judged that the estimated elliptical shape 76 is appropriate.

If the shape evaluation unit 81 judges that the estimated elliptical shape 76 is appropriate, an object shape determining unit 83 specifies the estimated elliptical shape 76 as a shape of the wood lumber material. A size measuring unit 84 measures a size (size of the wood lumber material in the object image) of the estimated elliptical shape 76 specified by the object shape determining unit 83. The size measuring unit 84 measures a height and width of the estimated elliptical shape 76.

A size determining unit 85 obtains an actual size of the wood lumber material according to the size measured by the size measuring unit 84, the distance to the wood lumber material detected by the photometry/rangefinding unit 47, and the focal length (zoom magnification) of the taking lens 12. The obtained actual size data of the wood lumber material is recorded to the memory card 45.

Figure 7:
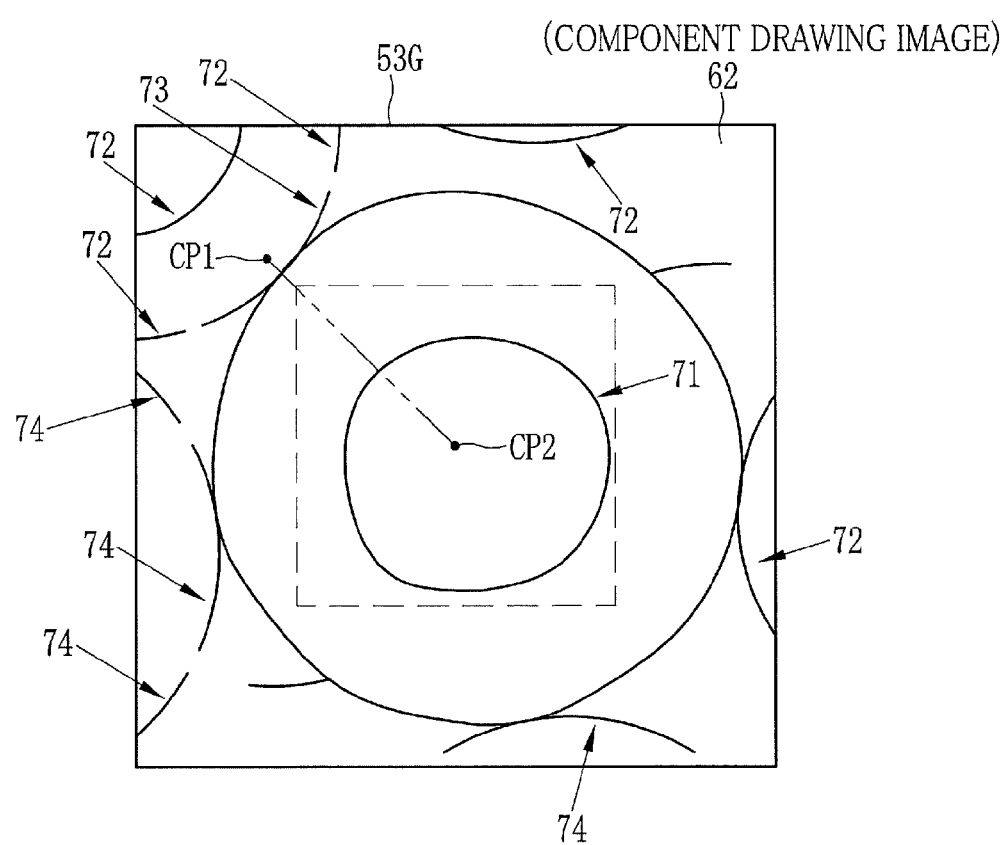
FIG. 7 is an explanatory view illustrating the component drawing image.

As shown in FIG. 7, an estimated elliptical shape of the component image areas 53A-53F has been determined to determine the shape of the wood lumber material for the time of converting images included in the component image area 53G into a drawing image to produce the component drawing image 62. Thus, the eliminator 66 eliminates also determined shape lines 74 (shape lines used with the component image areas 53A-53F) of the component images of which the shapes have been specified, namely the shape lines disposed in the left or bottom of the component drawing image 62, as well as the shape lines 71-73. Similarly, the determined shape lines 74 in addition to the shape lines 71-73 are eliminated at the time of specifying the shape of the wood lumber material in the component image areas 53B-53F and 53H-53L.

Figure 8:
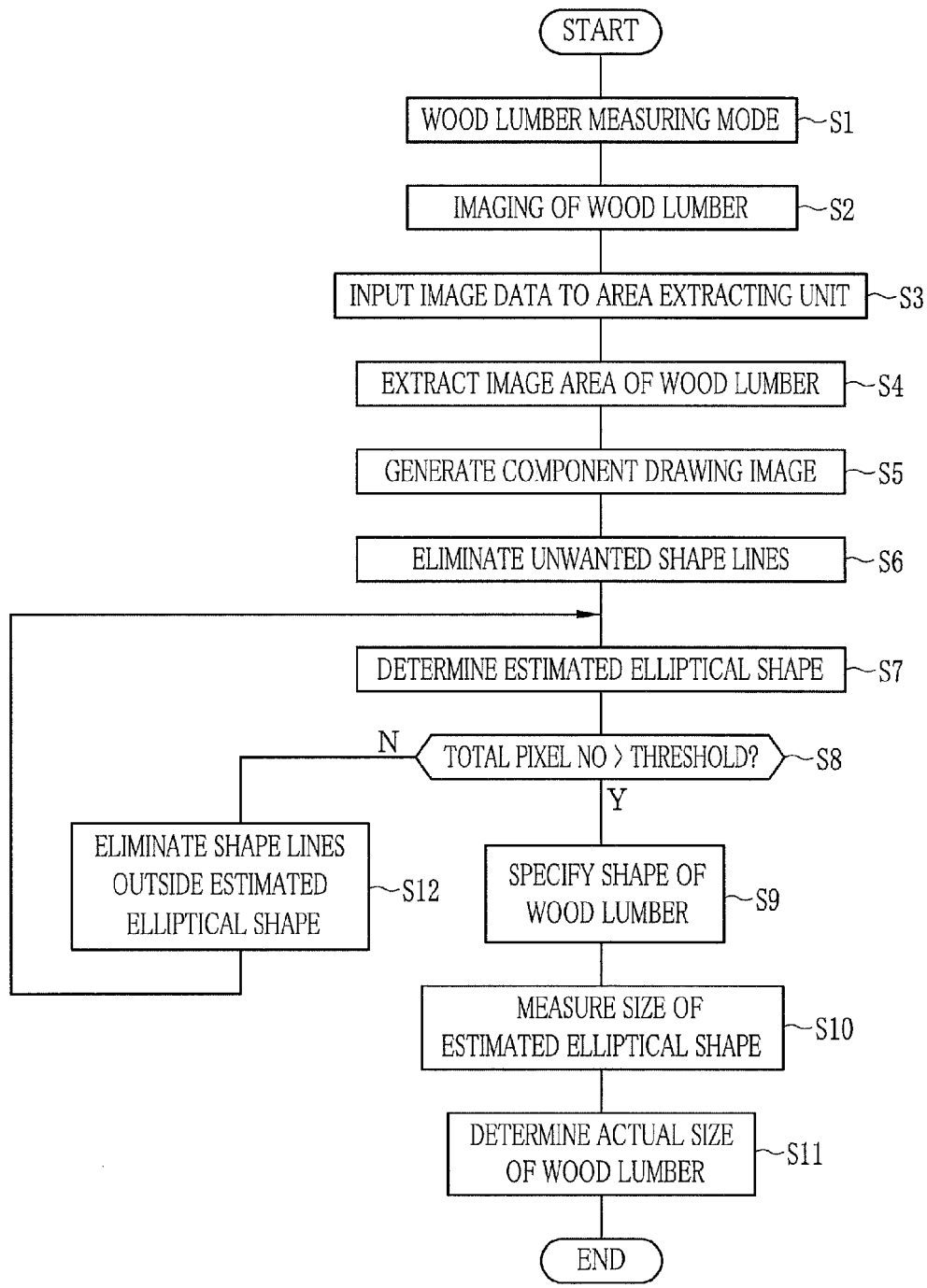
FIG. 8 is a flow chart illustrating processing steps for measuring an actual size of a wood lumber material.

The operation of the first embodiment is described by referring to the flow chart of FIG. 8. The release button 18 is depressed halfway in the wood lumber measuring mode (Step (hereinafter referred to as S) 1). A distance (object distance) to the wood lumber material (object) is detected by the photometry/rangefinding unit 47. Then the release button 18 is depressed fully for capturing an image (S2). Image data of an image captured by the CCD 31 is recorded to the buffer memory 42, and then retrieved by the area extracting unit 51 (S3). The area extracting unit 51 recognizes an ellipse in the object image 52, to extract the component image areas 53A-53L of the wood lumber material in the object image 52 (S4).

The drawing generator 61 selects one of the component image areas 53A-53L (for example, the component image area 53A) extracted by the area extracting unit 51. The target image detection filter 63 analyzes a change in the color inside the component image area 53A by the numerical analysis, and extracts an image of which a change in the color is higher than the detection threshold. The drawing generator 61 generates the component drawing image 62 (S5) by converting the extracted image into a drawing image.

The eliminator 66 eliminates the paracentral shape line 71, the edge side shape line 72, the peripheral shape line 73 and the determined shape lines 74 from shape lines included in the component drawing image 62 (S6), the paracentral shape line 71 having a center substantially in the same position as a center of the component drawing image 62, and having vertical and horizontal sizes equal to or less than a half of that of the component drawing image 62, the edge side shape line 72 contacting a boundary edge of the component image area 53A, the peripheral shape line 73 lying on a straight line passing the center CP1 of the shape line itself and the center CP2 of the component drawing image 62, and the determined shape lines 74 being associated with the estimated elliptical shape 76 which has been already specified.

The shape estimation unit 67 performs ellipse fitting to the corrected drawing image 64 after elimination of the shape lines 71-74, and determines the estimated elliptical shape 76 (S7) by estimating the wood lumber shape. The shape evaluation unit 81 detects a total pixel number of an overlapped portion between the residual shape line 75 in the corrected drawing image 64 and the estimated elliptical shape 76, and checks whether the total pixel number is more than a threshold (S8). If the total pixel number is more than the threshold (Y in S8), it is judged that the estimated elliptical shape 76 is appropriate. So the object shape determining unit 83 specifies the estimated elliptical shape 76 as a shape of a wood lumber material (S9). The size measuring unit 84 measures (S10) a size of the specified the estimated elliptical shape 76 (size of the wood lumber material in the object image). The size determining unit 85 arithmetically determines the actual size of the wood lumber material (S11) according to the size measured by the size measuring unit 84, the distance to the wood lumber material detected by the photometry/rangefinding unit 47, and the focal length. The data of the determined actual size of the wood lumber material is recorded to the memory card 45.

If the total pixel number is equal to or less than the threshold (N in S8), it is judged that the estimated elliptical shape 76 is not appropriate. The eliminator 66 eliminates the shape lines disposed outside the estimated elliptical shape 76. Then the steps including S7 and thereafter are carried out again. S1-S12 are carried out for all of the component image areas 53A-53L.

Accordingly, the paracentral shape line 71, the edge side shape line 72, the peripheral shape line 73 and the determined shape lines 74 are eliminated from the shape lines included in the component drawing image 62, to specify the shape by use of the corrected drawing image 64 after eliminating the shape lines 71-74. It is possible exactly to specify the shape in comparison with a method of specifying the shape by use of the component drawing image 62 inclusive of the shape lines 71-74.

[2nd Embodiment]

Figure 9:
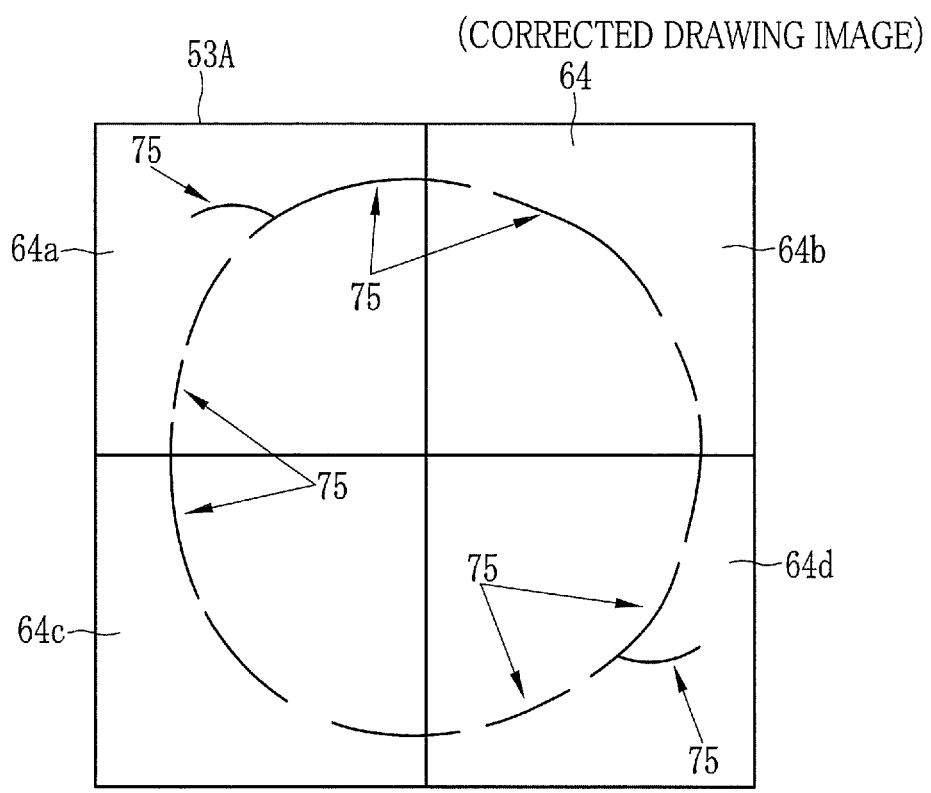
FIG. 9 is an explanatory view illustrating a corrected drawing image of a second embodiment in which the area is divided into four.

In a second embodiment shown in FIG. 9, the corrected drawing image 64 is split into four areas. The shape estimation unit 67 selects at least one shape line from each of the areas. Elements the same as those of the first embodiment are designated by the same reference numerals, and are not described further.

The shape estimation unit 67 divides the corrected drawing image 64 into first to fourth areas 64a-64d, and selects a shape line disposed in a predetermined position (for example, center) of each of the areas 64a-64d, for example, by one shape line. The shape estimation unit 67 performs the ellipse fitting for all the selected shape lines and determines the estimated elliptical shape 76. Thus, time taken for determining the estimated elliptical shape 76 is shorter than the method of ellipse fitting for all the shape lines within the corrected drawing image 64. Note that the division number for dividing the corrected drawing image 64 is not limited to four but is changeable suitably. For the division, it is preferable to divide the corrected drawing image 64 about its center point equally. The number of the shape line to be selected from each of the areas is not limited to one but is changeable suitably.

[3rd Embodiment]

Figure 10:
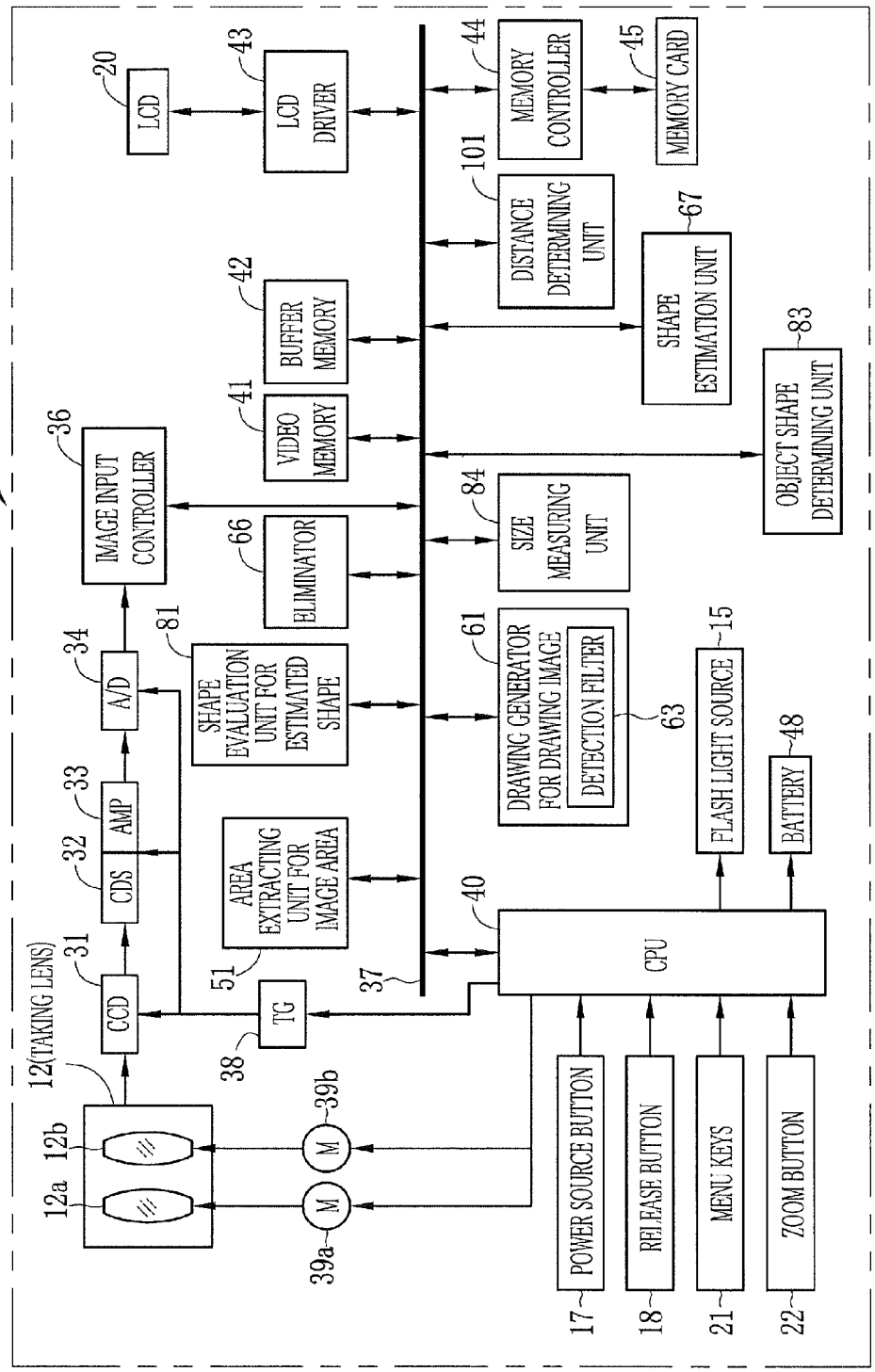
FIG. 10 is a block diagram illustrating electric arrangement of a digital camera in relation to a third embodiment in which a distance to the wood lumber material is measured.
Figure 11:
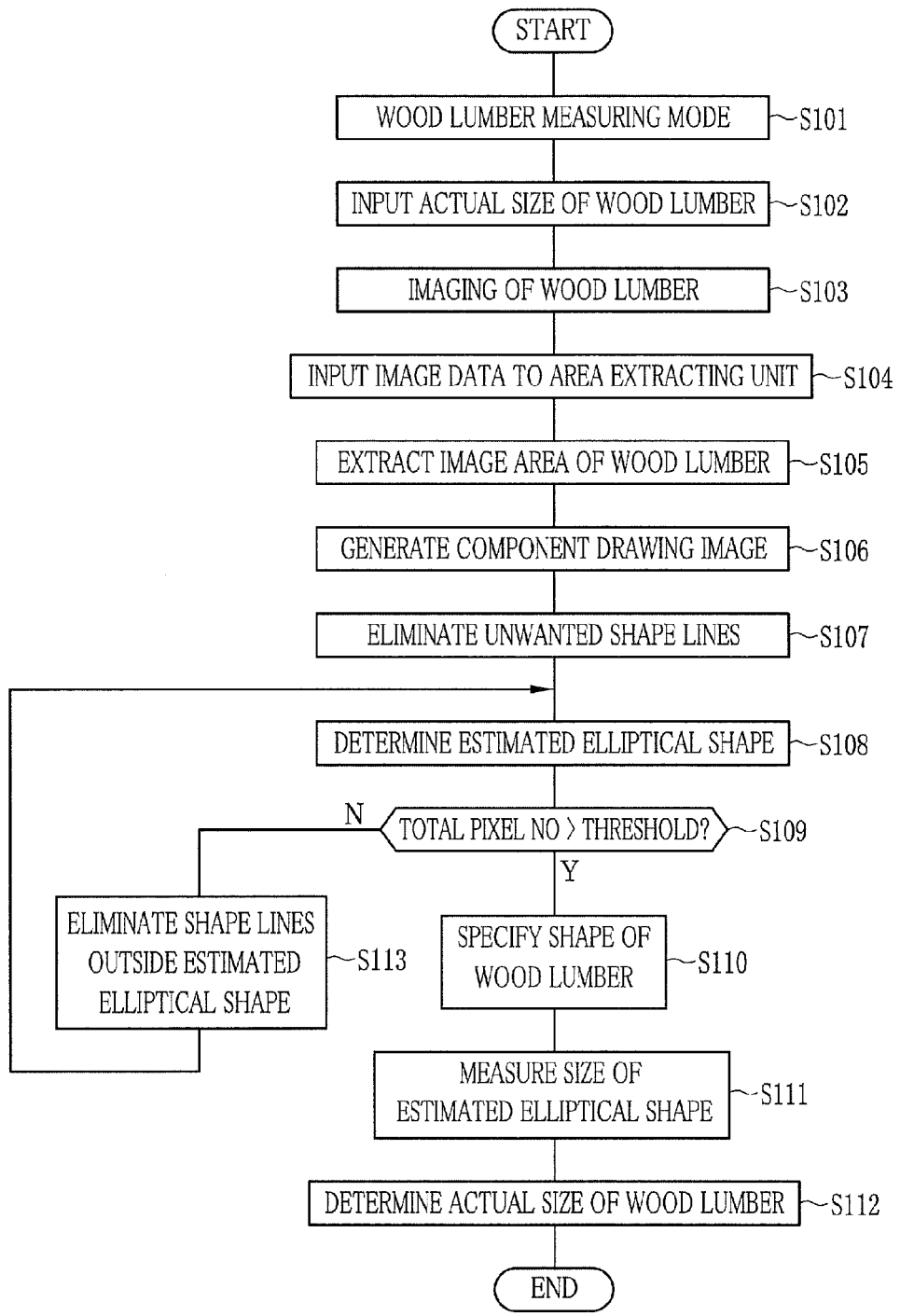
FIG. 11 is a flow chart illustrating processing steps for measuring a distance to the wood lumber material in a third embodiment.

In a digital camera 100 of a third embodiment shown in FIGS. 10 and 11, the photometry/rangefinding unit is omitted. A distance to a wood lumber material is arithmetically determined by use of the size measured by the size measuring unit 84. Elements the same as those of the first embodiment are designated by the same reference numerals, and are not described further.

As shown in FIG. 10, the digital camera 100 includes a distance determining unit 101 for arithmetically determining the distance to the wood lumber material (object). For imaging in the wood lumber measuring mode, a user manipulates the menu keys 21 to input an actual size of the wood lumber material as object. The distance determining unit 101 determines the distance to the wood lumber material according to the size measured by the size measuring unit 84, the input actual size of the wood lumber material, and the focal length.

The operation of the third embodiment is described next by referring to a flow chart of FIG. 11. In the wood lumber measuring mode (S101), the menu keys 21 are operated to input an actual size of the wood lumber material as object (S102). The release button 18 is depressed fully (S103) to input the captured image data to the area extracting unit 51 (S104). S105-S111 and S113 are the same as S4-S10 and S12 of the first embodiment, and are not described further.

When the size measuring unit 84 measures the size (size of the wood lumber material in the object image) of the estimated elliptical shape 76 (S111), the distance determining unit 101 arithmetically determines a distance to the wood lumber material (S112) according to the size measured by the size measuring unit 84, the input actual size of the wood lumber material, and the focal length. The determined distance data to the wood lumber material is recorded to the memory card 45. S101-S113 are carried out for all of the component image areas 53A-53L.

[4th Embodiment]

Figure 12:
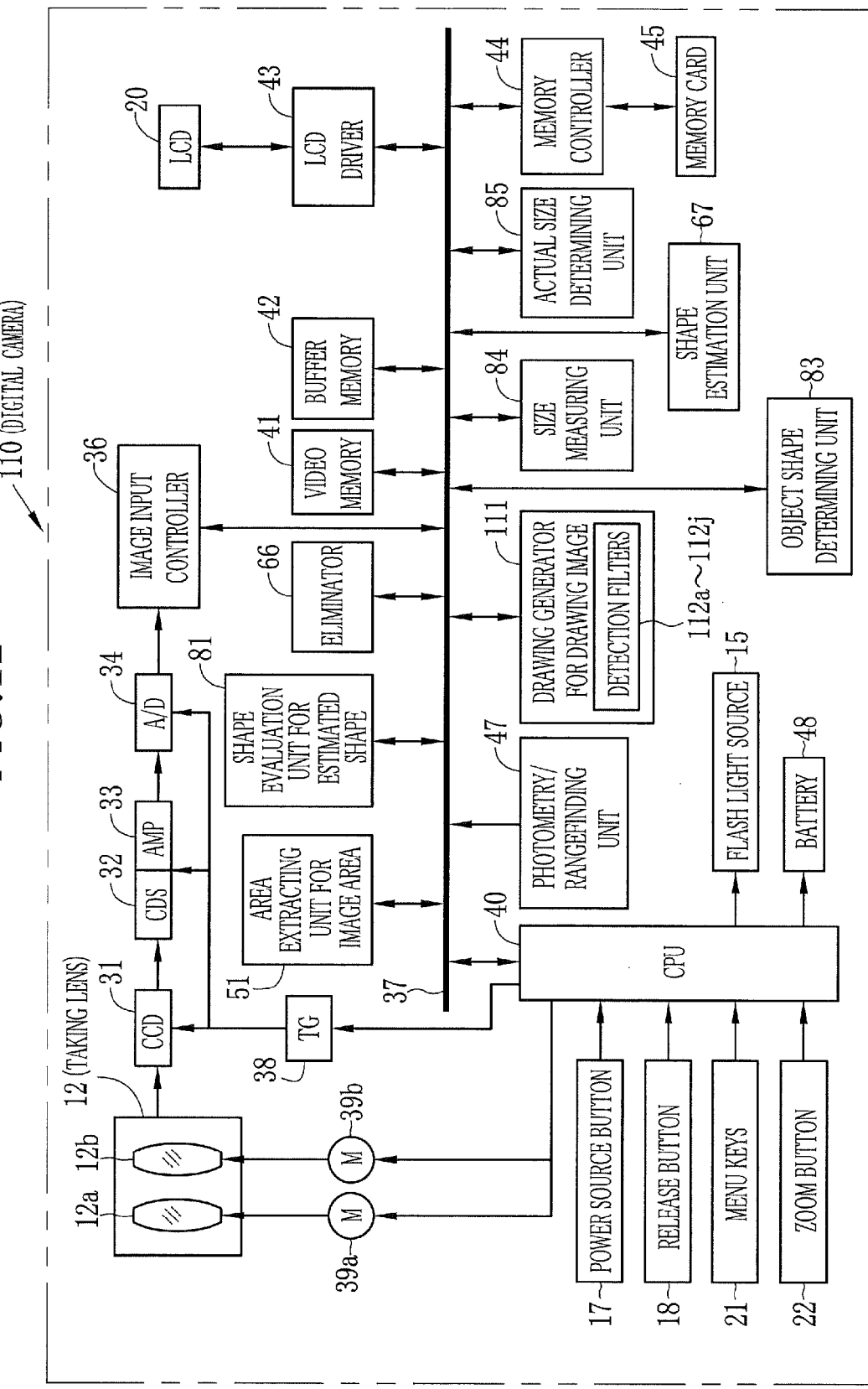
FIG. 12 is a block diagram illustrating electric arrangement of a digital camera in relation to a fourth embodiment including a plurality of target image detection filters.
Figure 13:
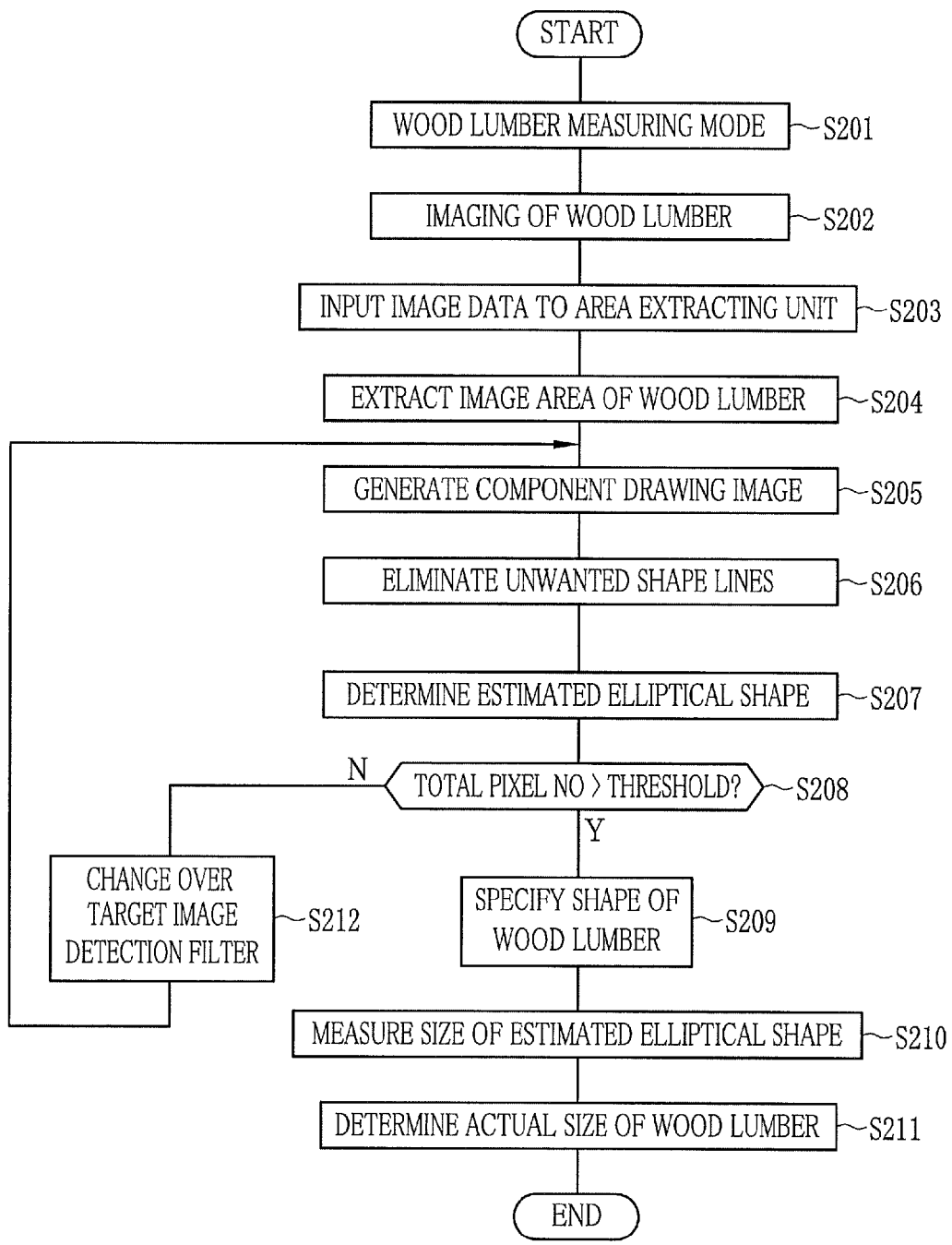
FIG. 13 is a flow chart illustrating processing steps for measuring an actual size of the wood lumber material in the fourth embodiment.

A digital camera 110 of a fourth embodiment shown in FIGS. 12 and 13 produces the component drawing image 62 newly if the shape evaluation unit 81 judges that the estimated elliptical shape 76 is not appropriate.

As shown in FIG. 12, a drawing generator 111 for a component drawing image includes a plurality of (for example 10) target image detection filters 112a-112j for extracting an image to be converted into a drawing image among the images inside the selected component image area. The target image detection filters 112a-112j are different in the detection threshold for extracting an image for conversion into a drawing image. The drawing generator 111 extracts an image for conversion into a drawing image by use of any one of the target image detection filters 112a-112j. The drawing generator in produces the component drawing image 62 by converting the extracted image into the drawing image.

If the shape evaluation unit 81 judges that the estimated elliptical shape 76 is not appropriate, the drawing generator 111 changes one of the target image detection filters 112a-112j for use, extracts an image again, and forms the component drawing image 62 newly. This is repeated until it is judged that the estimated elliptical shape 76 is appropriate. In the embodiment, the drawing generator 111 uses the target image detection filter 112a, target image detection filter 112b, target image detection filter 112c, . . . , target image detection filter 112i and target image detection filter 112j in the listed order.

If it is judged in all the target image detection filters 112a-112j that the estimated elliptical shapes 76 are inappropriate, then the object shape determining unit 83 specifies one of the estimated elliptical shapes 76 as a shape of a wood lumber material with a highest result of the evaluation.

The operation of the fourth embodiment is described next by referring to a flow chart of FIG. 13. The release button 18 is depressed fully (S202) in the wood lumber measuring mode (S201). Then captured image data is input to the area extracting unit 51 (S203).

The area extracting unit 51 extracts the component image areas 53A-53L of pieces of the wood lumber material in the object image 52 (S204). The drawing generator 111 selects one of the component image areas 53A-53L (for example, the component image area 53A) extracted by the area extracting unit 51. Any one of the target image detection filters 112a-112j (for example, the target image detection filter 112a) analyzes a change in the color inside the component image area 53A according to the numerical analysis, and extracts an image of which the change in the color is higher than the detection threshold. The drawing generator 111 generates the component drawing image 62 by converting the extracted image into a drawing image (S205). S206-S211 are the same as S6-S11 of the first embodiment, and are not described further.

If the pixel total number is equal to or smaller than the threshold (N in S208), it is judged that the estimated elliptical shape 76 is not appropriate. At this time, one of the target image detection filters 112a-112j for use is changed over (S212), to extract an image for conversion into a drawing again. The drawing generator 111 creates a new component drawing image 62 according to the newly extracted image (S205). Then the steps including S206 and thereafter are carried out again. S201-S212 are carried out for all of the component image areas 53A-53L. It is possible to measure a distance to the wood lumber material by applying the structure of the fourth embodiment to the third embodiment.

[5th Embodiment]

Figure 14:
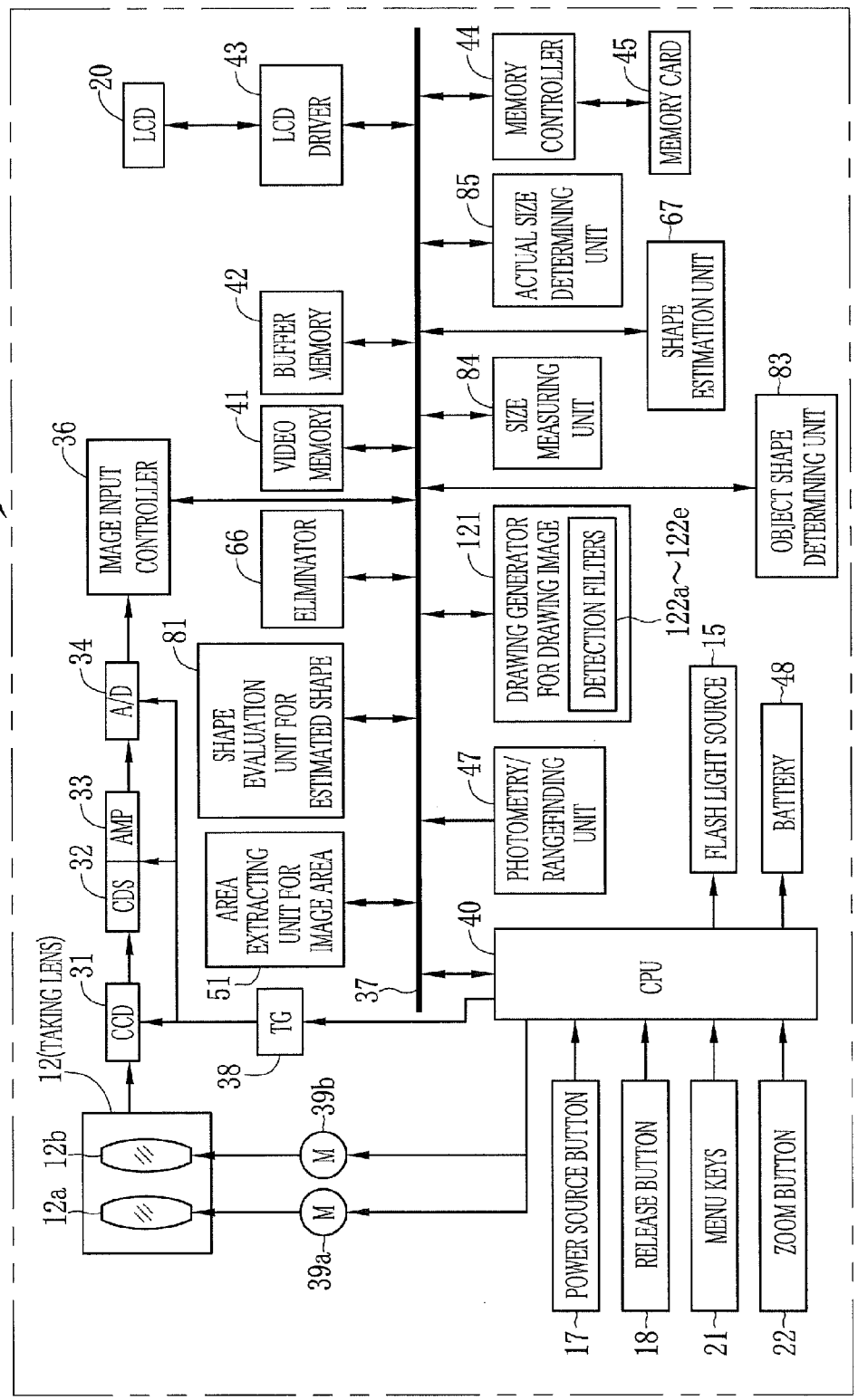
FIG. 14 is a block diagram illustrating electric arrangement of a digital camera in relation to a fifth embodiment for generating five estimated elliptical shapes for one component image area.
Figure 15:
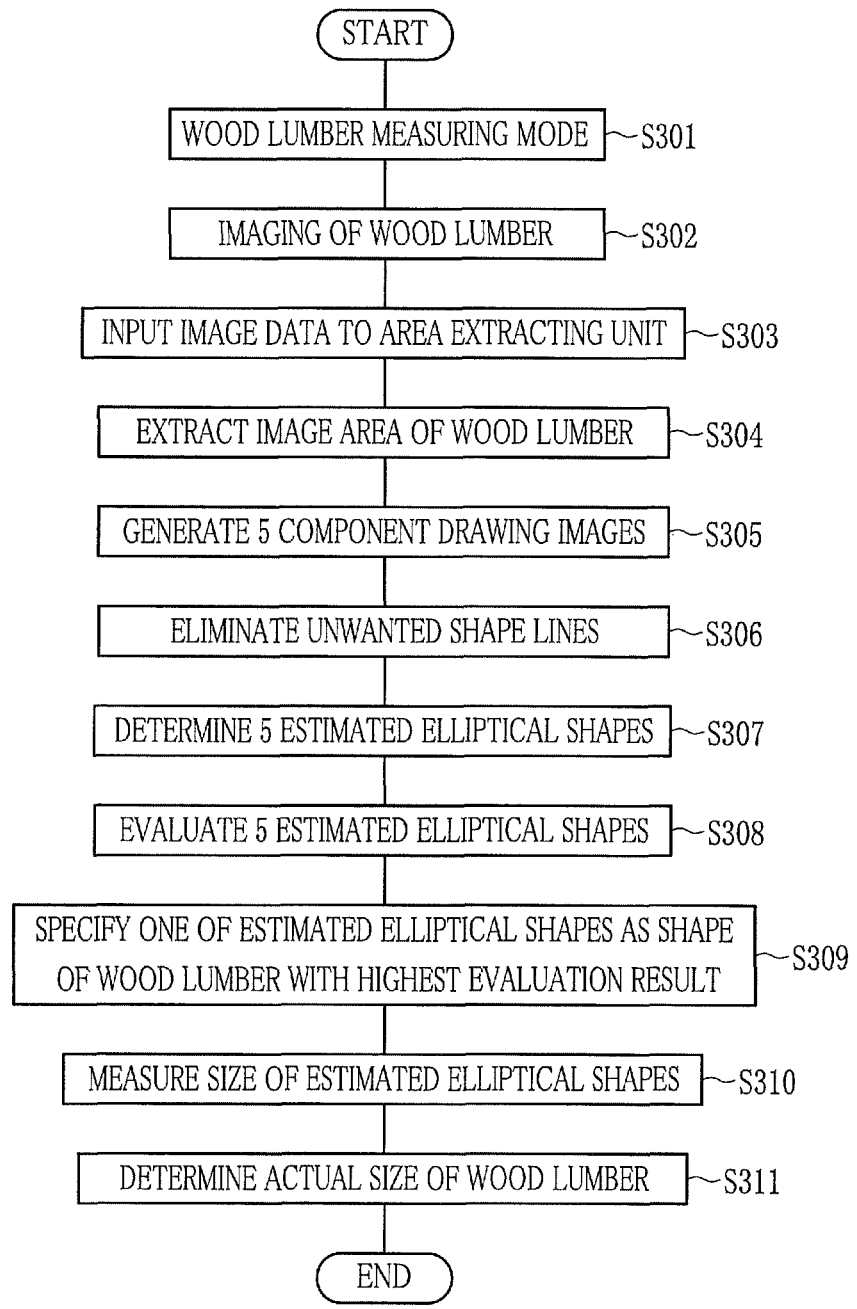
FIG. 15 is a flow chart illustrating processing steps for measuring an actual size of the wood lumber material in the fifth embodiment.

A digital camera 120 of a fifth embodiment shown in FIGS. 14 and 15 generates a plurality of (for example, five) component drawing images 62 from one component image area.

A drawing generator 121 for a component drawing image includes a plurality of (for example, five) target image detection filters 122a-122e for extracting images for conversion into drawing images among images included in the selected component image area. The target image detection filters 122a-122e are different in the detection threshold for extracting an image for conversion into a drawing image. The drawing generator 121 extracts images by use of respectively the target image detection filters 122a-122e, and produces five component drawing images 62 in correspondence thereto. The shape estimation unit 67 determines five estimated elliptical shapes 76 by use of the five component drawing images 62. The shape evaluation unit 81 evaluates and checks the five estimated elliptical shapes 76. The object shape determining unit 83 specifies one of the estimated elliptical shapes 76 as a wood lumber shape with a highest value of an evaluation result in the shape evaluation unit 81. The size measuring unit 84 measures the size of the specified estimated elliptical shape 76.

The operation of the fifth embodiment is described by referring to the flow chart of FIG. 15. In the wood lumber measuring mode (S301), the release button 18 is depressed fully for capturing an image (S302). Image data of a captured image is input to the area extracting unit 51 (S303). The area extracting unit 51 extracts the component image areas 53A-53L of the pieces of the wood lumber material in the object image 52 (S304). The drawing generator 61 selects one of the component image areas 53A-53L (for example, the component image area 53A) extracted by the area extracting unit 51. Each one of the target image detection filters 122a-122e analyzes a change in the color inside the component image area 53A according to the numerical analysis, and extracts an image of which the change in the color is higher than the detection threshold. The drawing generator 111 converts the image extracted by each of the target image detection filters 122a-122e into a drawing image, and generates five component drawing images 62 corresponding to the target image detection filters 122a-122e (S305).

The eliminator 66 eliminates the paracentral shape line 71, the edge side shape line 72, the peripheral shape line 73 and the determined shape lines 74 from each of the five component drawing images 62 (S306).

The shape estimation unit 67 performs the ellipse fitting to each of the five corrected drawing images 64, and determines the five estimated elliptical shapes 76 (S307). The shape evaluation unit 81 detects a total pixel number of an overlapped portion of each of the five estimated elliptical shapes 76 with the residual shape line 75. The shape evaluation unit 81 evaluates the five estimated elliptical shapes 76 according to the respectively detected total pixel number (S308).

The object shape determining unit 83 specifies one of the estimated elliptical shapes 76 as a wood lumber shape with a highest value of an evaluation result in the shape evaluation unit 81 (S309). The size measuring unit 84 measures the size of the specified estimated elliptical shape 76 (S310). The size determining unit 85 arithmetically determines an actual size of the wood lumber material according to the size measured by the size measuring unit 84, the distance to the wood lumber material detected by the photometry/rangefinding unit 47, and the focal length. S301-S311 are carried out for all of the component image areas 53A-53L. It is possible to measure the distance to the wood lumber material by applying the structure of the fifth embodiment to the third embodiment.

[6th Embodiment]

Figure 16:
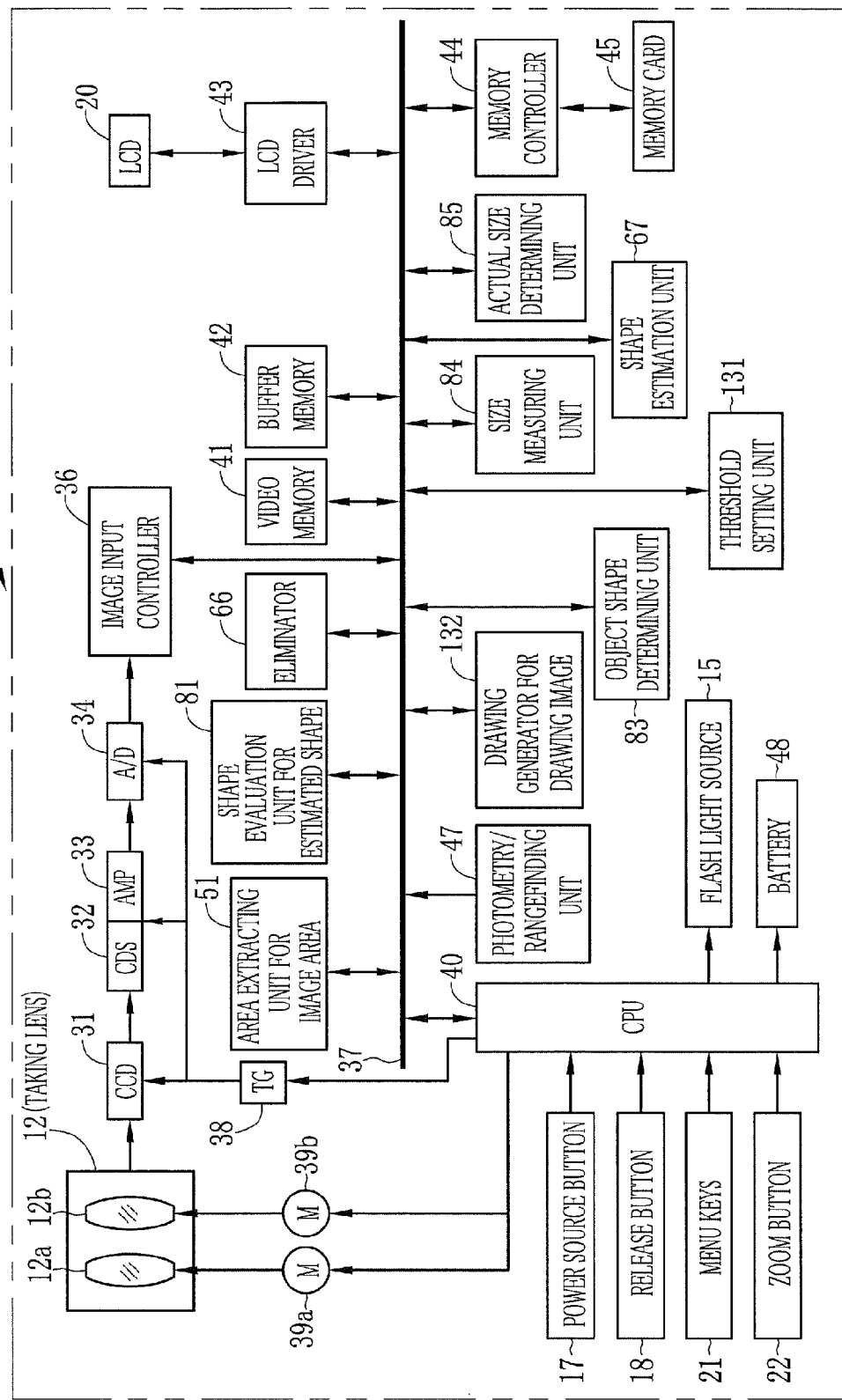
FIG. 16 is a block diagram illustrating electric arrangement of a digital camera in relation to a sixth embodiment including a threshold setting unit for determining a detection threshold.

A digital camera 130 of a sixth embodiment shown in FIGS. 16 and 17 includes a threshold setting unit 131 for determining a detection threshold for extracting an image to be converted into a drawing image among images included in the selected component image area.

As shown in FIG. 16, the threshold setting unit 131 analyzes the hue inside the selected component image area, and produces a histogram of the value of the hue, and obtains the detection threshold by adding a constant to a peak value of the produced histogram. Note that a constant may be subtracted from the peak value to obtain the detection threshold. A detection threshold can be a value equal to a difference from the peak value which appears at a constant frequency, a value or equal to a ratio to the peak value which appears at a constant frequency, or a value equal to a smallest difference from the peak value which appears at a constant frequency.

A drawing generator 132 for a component drawing image binarizes the image included in the component image area (extracts an image of which the value of the hue is higher than the detection threshold) according to the detection threshold set by the threshold setting unit 131, and generates the component drawing image 62.

If it is judged that the estimated elliptical shape 76 is not appropriate, the threshold setting unit 131 changes a constant for addition to the peak value, and determines a detection threshold again. The drawing generator 132 generates the component drawing image 62 newly according to the new detection threshold. This is repeated until it is judged that the estimated elliptical shape 76 is appropriate.

The operation of the sixth embodiment is described next by referring to a flow chart of FIG. 17. The release button 18 is depressed fully (S402) in the wood lumber measuring mode (S401). Then captured image data is input to the area extracting unit 51 (S403). The area extracting unit 51 extracts the component image areas 53A-53L of the pieces of the wood lumber material in the object image 52 (S404).

The drawing generator 132 selects one of the component image areas 53A-53L (for example, the component image area 53A) extracted by the area extracting unit 51. The threshold setting unit 131 analyzes the hue inside the component image area 53A, and produces a histogram of the value of the hue. The threshold setting unit 131 determines the detection threshold (S405) by adding a constant to a peak value of the produced histogram. The drawing generator 132 extracts an image of which the value of the hue is higher than the detection threshold determined by the threshold setting unit 131 among the images included in the component image area 53A. The drawing generator 132 converts the extracted image into a drawing to create the component drawing image 62 (S406). S407-S412 are the same as S6-S11 of the first embodiment, and are not described further.

If the total pixel number is equal to or less than the threshold (N in S409), then it is judged that the estimated elliptical shape 76 is not appropriate. The threshold setting unit 131 changes the constant for addition to the peak value of the histogram of the hue value of the component image area 53A, and arithmetically determines a new detection threshold (S413). The drawing generator 132 extracts an image from the component image area 53A by use of the new detection threshold, and generates the component drawing image 62 newly according to the new detection threshold (S406). Then the steps including S407 and thereafter are carried out again. S401-S413 are carried out for all of the component image areas 53A-53L. Note that a distance to the wood lumber material can be measured by applying the structure of the sixth embodiment to the third embodiment.

In the above embodiments, the digital camera is described. However, the present invention can be used in an image processing device (system) constituted by the digital camera, personal computer and the like. In this structure, the personal computer carries out the extraction of component image areas, generation of a component drawing image, elimination of unwanted shape lines, determination of an estimated shape, evaluation of appropriacy of the estimated shape, designation of the shape of an object, and measurement of the size of the object, according to the object image captured by the digital camera. Furthermore, the present invention can be used for a stereo camera for capturing a plurality of view images by imaging from a plurality of viewpoints, and a cellular telephone with a camera, and the like. For use in the stereo camera, a front elevational image as viewed in a front elevation is generated according to plural view images, so that the various processes are carried out according to the front elevational image.

In the above embodiments, the shape of the object is specified, and the actual size of the object or the distance to the object is measured according to the shape of the object. However, it is possible to specify at least the shape of the object.

In the embodiments described above, the paracentral shape line, edge side shape line, peripheral shape line and determined shape lines are eliminated from shape lines included in the component drawing image. However, it is possible to eliminate at least either one of the paracentral shape line and peripheral shape line.

Furthermore, it is possible to measure the size of the wood lumber material in a sequence of, for example, highness in the degree of coincidence of the shape, or in a sequence of highness of the definition. Also, the sequence can be determined by a user.

In the above embodiments, the estimated elliptical shape is evaluated for the appropriacy according to the total pixel number of the portion of overlapping the estimated elliptical shape with the shape lines within the corrected drawing image. Alternatively, it is possible to evaluate the appropriacy according to the pixel number of the shape lines within a predetermined distance from the estimated elliptical shape. It is preferable to carryout weighting of the shape lines in an order of nearness to the estimated elliptical shape.

In the sixth embodiment described above, the threshold setting unit determines the detection threshold again if it is judged that the estimated elliptical shape is not appropriate. However, the threshold setting unit can previously determine plural detection thresholds, with which a plurality of component drawing images can be generated. In this structure, one of the component drawing images of which an evaluation result is the highest is used for determining the actual size of the wood lumber material.

Note that, although the threshold setting unit sets the detection threshold in the sixth embodiment described above, a plurality of detection thresholds can be predetermined.

Description of the Reference Numerals 53A-53L component image areas
54A-54L wood lumber images
64a-64d first to fourth areas
71 paracentral shape line
72 edge side shape line
73 peripheral shape line
74 determined shape lines
75 residual shape line
76 estimated elliptical shape

The invention claimed is:

1. A shape extraction device comprising:
an area extracting unit for recognizing component images in which it is presumed that an object in a particular shape is imaged within a frame, to extract component image areas from said frame in which said component images are respectively present;
a drawing generator for sequentially selecting said component image areas, and converting images including said component image in said selected component image areas into respectively a drawing image, to generate a component drawing image;
an eliminator for eliminating one shape line and/or a certain shape line as an unwanted shape line among shape lines included in respectively said component drawing image, said one shape line having a center in a substantially equal position to a center of said component drawing image and having vertical and horizontal sizes equal to or less than substantially a half of a size of said component drawing image, said certain shape line being disposed on a straight line passing a center point of said one shape line and a center point of said component drawing image;
a shape estimation unit for determining an estimated shape by optimizing a size of said particular shape so as to correspond to a corrected drawing image after elimination of said unwanted shape line;
an evaluation unit for judging appropriacy of said estimated shape by evaluating degree of overlap between said estimated shape and said corrected drawing image; and
an object shape determining unit for specifying said estimated shape as a shape of said object extracted from said frame if it is judged that said estimated shape is appropriate.

2. A shape extraction device as defined in claim 1, wherein, if said component image areas overlap on one another, said eliminator further eliminates a shape line of said corrected drawing image in relation to said object of which a shape has been specified.

3. A shape extraction device as defined in claim 1, wherein said eliminator further eliminates a shape line contacting a boundary edge of said component image areas.

4. A shape extraction device as defined in claim 2, wherein said shape estimation unit splits said corrected drawing image into plural areas, and selects a shape line from each of said plural areas, to determine said estimated shape according to a plurality of said selected shape line.

5. A shape extraction device as defined in claim 2, wherein, if it is judged that said estimated shape is inappropriate, said eliminator eliminates a shape line outside said estimated shape.

6. A shape extraction device as defined in claim 1, wherein said drawing generator includes a plurality of target image detection filters between which thresholds are different for extracting an image to be converted into a drawing image among images included in said selected component image areas, said drawing generator converts said image extracted with each of said target image detection filters into a drawing image, to generate said component drawing image;
wherein if it is judged that said estimated shape is inappropriate, said drawing generator generates a new component drawing image by changing over said target image detection filters.

7. A shape extraction device as defined in claim 1, wherein said drawing generator includes a plurality of target image detection filters between which thresholds are different for extracting an image to be converted into a drawing image among images included in said selected component image areas, said drawing generator converts said image extracted with each of said target image detection filter into a drawing image, to generate a plurality of said component drawing image for any one of said component image areas;
wherein said shape estimation unit determines a plurality of said estimated shape respectively by use of said plural component drawing images;

said evaluation unit evaluates respectively said plural estimated shapes; and said object shape determining unit specifies one of said plural estimated shapes as a shape of said object with a highest evaluation result in said evaluation unit.

8. A shape extraction device as defined in claim 1, wherein said drawing generator has a plurality of thresholds for binarizing images included in said selected component image areas to generate said component drawing image, and binarizes said images included in said selected component image areas according to any one of said thresholds to generate said component drawing image;

wherein if it is judged that said estimated shape is inappropriate, said drawing generator generates a new component drawing image by changing over said thresholds.

9. A shape extraction device as defined in claim 1, wherein said drawing generator has a plurality of thresholds for binarizing images included in said selected component image areas to generate said component drawing image, and binarizes said images included in said selected component image areas according to each one of said thresholds to generate a plurality of said component drawing image for any one of said component image areas;

wherein said shape estimation unit determines a plurality of said estimated shape respectively by use of said plural component drawing images;

said evaluation unit evaluates respectively said plural estimated shapes; and said object shape determining unit specifies one of said plural estimated shapes as a shape of said object with a highest evaluation result in said evaluation unit.

10. A shape extraction device as defined in claim 1, further comprising a threshold setting unit for determining a threshold for generating said component drawing image by binarizing images included in said selected component image areas;

wherein said drawing generator binarizes said images included in said selected component image areas according to said threshold determined by said threshold setting unit, and generates said component drawing image; and if it is judged that said estimated shape is inappropriate, said threshold setting unit determines a new threshold, and said drawing generator generates a new component drawing image according to said new threshold.

11. A shape extraction device as defined in claim 1, further comprising a threshold setting unit for determining a plurality of thresholds for generating said component drawing image by binarizing images included in said selected component image areas;

wherein said drawing generator binarizes said images included in said selected component image areas for each of said plural thresholds and generates said plural component drawing images for one of said component image areas;

said shape estimation unit determines a plurality of said estimated shape respectively by use of said plural component drawing images;

said evaluation unit evaluates respectively said plural estimated shapes; and said object shape determining unit specifies one of said plural estimated shapes as a shape of said object with a highest evaluation result in said evaluation unit.

12. A size measuring device comprising:

an area extracting unit for recognizing component images in which it is presumed that an object in a particular shape is imaged within a frame, to extract component image areas from said frame in which said component images are respectively present;

a drawing generator for sequentially selecting said component image areas, and converting images including said component image in said selected component image areas into respectively a drawing image, to generate a component drawing image;

an eliminator for eliminating one shape line and/or a certain shape line as an unwanted shape line among shape lines included in respectively said component drawing image, said one shape line having a center in a substantially equal position to a center of said component drawing image and having vertical and horizontal sizes equal to or less than substantially a half of a size of said component drawing image, said certain shape line being disposed on a straight line passing a center point of said one shape line and a center point of said component drawing image;

a shape estimation unit for determining an estimated shape by optimizing a size of said particular shape so as to correspond to a corrected drawing image after elimination of said unwanted shape line;

an evaluation unit for judging appropriacy of said estimated shape by evaluating degree of overlap between said estimated shape and said corrected drawing image;

an object shape determining unit for specifying said estimated shape as a shape of said object extracted from said frame if it is judged that said estimated shape is appropriate;

a rangefinding unit for measuring a distance to said object for imaging said object;

a size measuring unit for measuring a size of said shape of said object specified by said object shape determining unit; and a size determining unit for determining an actual size of said object according to said distance measured by said rangefinding unit and said size measured by said size measuring unit.

13. A size measuring device as defined in claim 12, further comprising a magnification input unit for inputting an imaging magnification for imaging said object;

wherein said size determining unit determines said actual size of said object according to said distance measured by said rangefinding unit, said size measured by said size measuring unit, and said imaging magnification input by said magnification input unit.

14. A distance measuring device comprising:

an area extracting unit for recognizing component images in which it is presumed that an object in a particular shape is imaged within a frame, to extract component image areas from said frame in which said component images are respectively present;

a drawing generator for sequentially selecting said component image areas, and converting images including said component image in said selected component image areas into respectively a drawing image, to generate a component drawing image;

an eliminator for eliminating one shape line and/or a certain shape line as an unwanted shape line among shape lines included in respectively said component drawing image, said one shape line having a center in a substantially equal position to a center of said component drawing image and having vertical and horizontal sizes equal to or less than substantially a half of a size of said component drawing image, said certain shape line being disposed on a straight line passing a center point of said one shape line and a center point of said component drawing image;

a shape estimation unit for determining an estimated shape by optimizing a size of said particular shape so as to correspond to a corrected drawing image after elimination of said unwanted shape line;

an evaluation unit for judging appropriacy of said estimated shape by evaluating degree of overlap between said estimated shape and said corrected drawing image;

an object shape determining unit for specifying said estimated shape as a shape of said object extracted from said frame if it is judged that said estimated shape is appropriate;

a size input unit for inputting an actual size of said object;

a size measuring unit for measuring a size of said shape of said object specified by said object shape determining unit; and a distance determining unit for determining a distance to said object for imaging said object according to said actual size input by said size input unit and said size measured by said size measuring unit.

15. A distance measuring device as defined in claim 14, comprising a magnification input unit for inputting an imaging magnification for imaging said object;

wherein said distance determining unit determines said distance to said object according to said actual size input by said size input unit, said size measured by said size measuring unit, and said imaging magnification input by said magnification input unit.

16. A shape extraction method comprising:

an area extracting step of recognizing component images in which it is presumed that an object in a particular shape is imaged within a frame, to extract component image areas from said frame in which said component images are respectively present;

a drawing generation step of sequentially selecting said component image areas, and converting images including said component image in said selected component image areas into respectively a drawing image, to generate a component drawing image;

an elimination step of eliminating one shape line and/or a certain shape line as an unwanted shape line among shape lines included in respectively said component drawing image, said one shape line having a center in a substantially equal position to a center of said component drawing image and having vertical and horizontal sizes equal to or less than substantially a half of a size of said component drawing image, said certain shape line being disposed on a straight line passing a center point of said one shape line and a center point of said component drawing image;

a shape estimation step of determining an estimated shape by optimizing a size of said particular shape so as to correspond to a corrected drawing image after elimination of said unwanted shape line;

an evaluation step of judging appropriacy of said estimated shape by evaluating degree of overlap between said estimated shape and said corrected drawing image; and an object shape determining step of specifying said estimated shape as a shape of said object extracted from said frame if it is judged that said estimated shape is appropriate.

17. A shape extraction device as defined in claim 1, wherein said drawing generator includes a plurality of target image detection filters between which thresholds are different for extracting an image to be converted into a drawing image among images included in said selected component image areas, said drawing generator converts said image extracted with each of said target image detection filters into a drawing image, to generate said component drawing image.

18. A shape extraction device as defined in claim 1, wherein said drawing generator has a plurality of thresholds for binarizing images included in said selected component image areas to generate said component drawing image, and binarizes said images included in said selected component image areas according to any one of said thresholds to generate said component drawing image.

19. A shape extraction device as defined in claim 1, further comprising a threshold setting unit for determining a threshold for generating said component drawing image by binarizing images included in said selected component image areas, wherein said drawing generator binarizes said images included in said selected component image areas according to said threshold determined by said threshold setting unit, and generates said component drawing image.

* * * * *